US012531373B2

(12) United States Patent
Fritsch

(10) Patent No.: US 12,531,373 B2
(45) Date of Patent: Jan. 20, 2026

(54) UNLOCKING ELEMENT AND ELECTRICAL PLUG-IN PROVIDED THEREWITH

(71) Applicant: Neutrik AG, Schaan (LI)

(72) Inventor: Stefan Fritsch, Übersaxen (AT)

(73) Assignee: Neutrik AG, Schaan (LI)

( * ) Notice: Subject to any disclaimer, the term of this patent is extended or adjusted under 35 U.S.C. 154(b) by 377 days.

(21) Appl. No.: 18/074,599

(22) Filed: Dec. 5, 2022

(65) Prior Publication Data

US 2023/0178936 A1 Jun. 8, 2023

(30) Foreign Application Priority Data

Dec. 3, 2021 (AT) .............................. A 50971/2021

(51) Int. Cl.
*H01R 13/633* (2006.01)
*H01R 13/627* (2006.01)
*H01R 24/60* (2011.01)

(52) U.S. Cl.
CPC ....... *H01R 13/633* (2013.01); *H01R 13/6272* (2013.01); *H01R 24/60* (2013.01)

(58) Field of Classification Search
None
See application file for complete search history.

(56) References Cited

U.S. PATENT DOCUMENTS 7,131,854 B1 * 11/2006 Pavlovic .............. H01R 13/633 439/352
7,144,267 B1 * 12/2006 Huang ............... H01R 13/6275 439/352
9,156,363 B2 * 10/2015 Nakajima ............... B60L 50/66
9,168,840 B2 * 10/2015 Nakajima .......... H01R 13/6397
9,178,312 B2 * 11/2015 Nakajima ............ H01R 13/639
9,197,012 B2 * 11/2015 Nakajima .......... H01R 13/6397
9,214,757 B2 * 12/2015 Harkins ............. H01R 13/5213
9,216,656 B2 * 12/2015 Nakajima .......... H01R 13/6275
9,263,830 B2 * 2/2016 Sugiyama ............... B60L 53/16
9,350,118 B2 * 5/2016 Nakajima ............... B60L 53/16
9,509,095 B2 * 11/2016 Ohmura .................. B60L 53/16
11,056,830 B2 * 7/2021 Motomiya ........... H01R 13/639
(Continued)

FOREIGN PATENT DOCUMENTS

CN 205752771 11/2016
EP 0952634 A2 * 10/1999 ......... H01R 13/4361
(Continued)

*Primary Examiner* — Abdullah A Riyami
(74) *Attorney, Agent, or Firm* — Volpe Koenig

(57) ABSTRACT

An unlocking element (17) for electrical plug-in connections, for acting on an elastically deflectable or displaceable locking arm (16) of a locking arrangement (16, 17). The unlocking element (17) has at least one actuating tab (21), configured to be touched by a user and is coated with or produced from electrically insulating plastic. The center point (Z) of the actuating tab (21) and a longitudinal center axis (L) of the connecting portion (18) of the unlocking element (17) are offset with respect to one another radially in relation to this longitudinal center axis (L). An electrical plug-in connector for producing an electrical plug-in connection with a complementary plug-in connector is provided with a locking arrangement (16, 17) for the complementary plug-in connector, with the unlocking element (17).

10 Claims, 20 Drawing Sheets

(56) References Cited

U.S. PATENT DOCUMENTS

| | | | | |
|---|---|---|---|---|
| 11,623,538 | B1 * | 4/2023 | Vega | B60L 53/35 439/159 |
| 2008/0268719 | A1 * | 10/2008 | Siemon | H01R 13/6469 439/719 |
| 2012/0058652 | A1 * | 3/2012 | Wang | H01R 13/6335 439/76.1 |
| 2012/0218720 | A1 * | 8/2012 | Wu | H01R 13/6275 361/740 |
| 2012/0220152 | A1 * | 8/2012 | Wu | H01R 13/6581 439/350 |
| 2012/0294571 | A1 * | 11/2012 | Kappla | H01R 13/6275 385/76 |
| 2013/0183846 | A1 * | 7/2013 | Kappla | H01R 13/6335 439/350 |
| 2013/0323959 | A1 * | 12/2013 | Zhu | H01R 13/62 439/353 |
| 2015/0037994 | A1 * | 2/2015 | Nakajima | H01R 13/631 439/304 |
| 2016/0126672 | A1 * | 5/2016 | Kawamura | H01R 13/633 439/153 |
| 2020/0379191 | A1 * | 12/2020 | Hikosaka | H01R 13/629 |
| 2020/0395706 | A1 * | 12/2020 | Ishikawa | H01R 13/4364 |
| 2020/0395710 | A1 * | 12/2020 | Ishikawa | H01R 13/533 |
| 2021/0151942 | A1 * | 5/2021 | Dobler | H01R 24/38 |
| 2021/0288439 | A1 * | 9/2021 | Kamemura | H01R 13/4364 |
| 2021/0344133 | A1 * | 11/2021 | Menzies | H01R 13/6456 |
| 2021/0376545 | A1 * | 12/2021 | Shih | H01R 43/26 |

FOREIGN PATENT DOCUMENTS

| | | |
|---|---|---|
| EP | 2783427 | 12/2015 |
| WO | 0120727 | 3/2001 |
| WO | 2021058131 | 4/2021 |

* cited by examiner

UNLOCKING ELEMENT AND ELECTRICAL PLUG-IN PROVIDED THEREWITH

INCORPORATION BY REFERENCE

The following documents are incorporated herein by reference as if fully set forth: Austrian Patent Application No. A 50971/2021, filed Dec. 3, 2021.

TECHNICAL FIELD

The invention relates to an unlocking element for electrical plug-in connections, and to an electrical plug-in connector, in particular a built-in plug socket, for producing an electrical plug-in connection with a complementary plug-in connector.

BACKGROUND

Electrical plug-in connectors, in particular built-in plug sockets, for producing an electrical plug-in connection with a complementary plug-in connector are often provided with locking arrangements, by means of which the complementary plug-in connector can be secured against inadvertent release of the plug-in connection. Plug-in connectors have been known for a long time and are described, for example, in EP 2783427 B1. They have a housing, in which at least a first plug-in opening, into which a complementary plug-in connector can be plugged in the direction of a plug-in axis, is formed. At least one electrical contact element is fixed in the housing, preferably in at least one contact carrier held in the housing or formed thereby, and preferably is held in the contact carrier. Often, the locking arrangement for the complementary plug-in connector is also received in the contact carrier.

Typically, locking arrangements of this type in built-in plug sockets comprise at least one elastically deflectable or displaceable locking arm each having at least a first locking structure, in particular a locking projection, which, in a fully plugged-in state of the complementary plug-in connector, couples into a second, complementary locking structure of this complementary plug-in connector. To that end, for example, an opening, undercut or similar notch may be provided on the plug. To release the locking mechanism, in order to make it possible thereby to pull the plug out of the built-in plug socket, the user actuates at least one unlocking element and displaces it from a passive position into an active position manually, preferably parallel to the plug-in axis. In this active position, at least one actuating portion engages on the unlocking element, preferably an actuating projection, and keeps its locking structure out of engagement with the complementary locking structure on the complementary plug.

The unlocking element for these locking arrangements for electrical plug-in connections, which is intended to act on an elastically deflectable or displaceable locking arm of the locking arrangement, preferably has a rigid configuration. This means that, when used as intended, there is no change of shape, such as for example bending, compression or the like, of the unlocking element.

SUMMARY

It was an object of the present invention to overcome the disadvantages of the prior art and to provide a device which makes it possible to achieve a shallower built-in depth of the electrical plug-in connector and which protects both the electrical and electronic units of the built-in plug socket and downstream components or assemblies, and also the user who must touch the plug and the unlocking element, against damage or harm, respectively.

This object is achieved by a device having one or more of the features dis-closed herein.

The unlocking element according to the invention is characterized in that it has at least one actuating tab, which is designed to be touched by a user and is coated with or produced from electrically insulating plastic.

This makes it possible to avoid rapid discharge through an electrostatically charged person or object who or which actuates, or simply touches, the unlocking element. Damage caused by electrostatic discharges, in particular in microelectronic components and/or integrated circuits, can thus be prevented.

One advantageous embodiment is further characterized in that the unlocking element is entirely coated with or entirely produced from electrically insulating plastic. This makes it possible to achieve the highest possible safety with respect to electrostatic discharges.

Preference is given to an asymmetrical embodiment of the unlocking element, in which a connecting portion extends from the actuating tab in the direction of the actuating portion substantially parallel to the actuation travel, wherein the central point of the actuating tab and a longitudinal center axis of the connecting portion are offset with respect to one another radially in relation to this longitudinal center axis. Typically, the locking arrangements are arranged centrally at the top in the longitudinal center plane of the built-in plug sockets. As a result of the lateral offset of the longitudinal center axis of the unlocking element and of the center point of the actuating tab, the actuating tab is out of the longitudinal center and, as viewed in the vertical direction, at somewhat less of a height, with the result that the built-in plug socket as a whole has a smaller vertical structural height and multiple built-in plug sockets can be installed one above another in a more densely packed manner. Accordingly, good operability of the unlocking element is maintained even in the case of this asymmetrical shape of the actuating tab in relation to the longitudinal center axis of the unlocking element.

One advantageous embodiment of an unlocking element according to the invention is characterized in that the actuating portion is arranged at the outermost rear end of the unlocking element and no portion of the unlocking element protrudes rearwardly beyond it, said actuating portion thereby forming a rear end face of the unlocking element. This enables optimum protection for the user and the unit against electrostatic discharges combined with a very short construction.

In order to ensure optimum force transfer when the unlocking element is being actuated, the actuating tab is preferably aligned perpendicularly to the connecting portion and/or to the actuation travel.

By contrast, also possible are embodiments in which the unlocking element, in the form of a slide, is movable along the surface of the housing, in that case the actuating tab being aligned parallel to the connecting portion and/or to the actuation travel.

To achieve the object presented in the introduction, in the case of an electrical plug-in connector, in particular a built-in plug socket, for the purpose of producing an electrical plug-in connection with a complementary plug-in connector, in particular a cable plug, the unlocking element of the locking arrangement provided is designed according to one of the preceding passages.

It is preferred here for the center point of the actuating tab to be offset with respect to the center axis, which is vertical in the built-in position, by an angle between 30° and 60°, preferably substantially 45°. This produces an asymmetrical arrangement of the actuating tab, as a result of which, while maintaining the same surface area, the overall structural height of the built-in plug socket is reduced and therefore a space-saving arrangement of multiple sockets is possible. It likewise facilitates unlocking in the case of plug sockets situated one above another.

It is of course possible here, too, to provide an aforementioned asymmetrical embodiment of the unlocking element in which the center point of the actuating tab and a longitudinal center axis of the connecting portion of the unlocking element are offset with respect to one another radially in relation to the longitudinal center axis.

In that case, a preferred embodiment of the invention is further characterized in that a longitudinal center axis of the connecting portion is substantially in line with the center point of the actuating tab and is offset with respect to the center axis, which is vertical in the built-in position, by an angle between 30° and 60°, preferably substantially 45°.

A further embodiment of the invention provides that a longitudinal center axis of the connecting portion is arranged substantially in the region of the vertical center axis. This makes it possible to use the new construction even in the case of already existing built-in plug sockets as a swap for the existing arrangements, and afford the aforementioned advantages.

In order to optimize safety as much as possible in relation to avoiding electrostatic discharges, a further embodiment according to the invention may be characterized in that the unlocking surface of the locking arm is at least partially coated with or produced from electrically insulating plastic or the entire locking arm is coated with or produced from electrically insulating plastic.

For a compact structure of the built-in plug socket, the locking arrangement for the complementary plug-in connector is preferably received in a recess in the housing and/or in the contact carrier.

It is particularly advantageous here when the unlocking element is mounted in a recess of the contact carrier so as to be displaceable parallel to the plug-in axis.

A further embodiment of a plug-in connector according to the invention provides that a second, oppositely oriented plug-in opening for a further plug-in connector is arranged on the opposite side to the first plug-in opening and preferably is likewise equipped with a locking arrangement, in particular a locking arrangement as described above hitherto. This makes it possible to achieve the aforementioned advantages also in the case of the corresponding couplings for cable extensions.

BRIEF DESCRIPTION OF THE DRAWINGS

For the purpose of better understanding the invention, it is explained in more detail with reference to the following figures.

In the figures, in each case in a highly simplified and schematic illustration.

DETAILED DESCRIPTION

Figure 1:
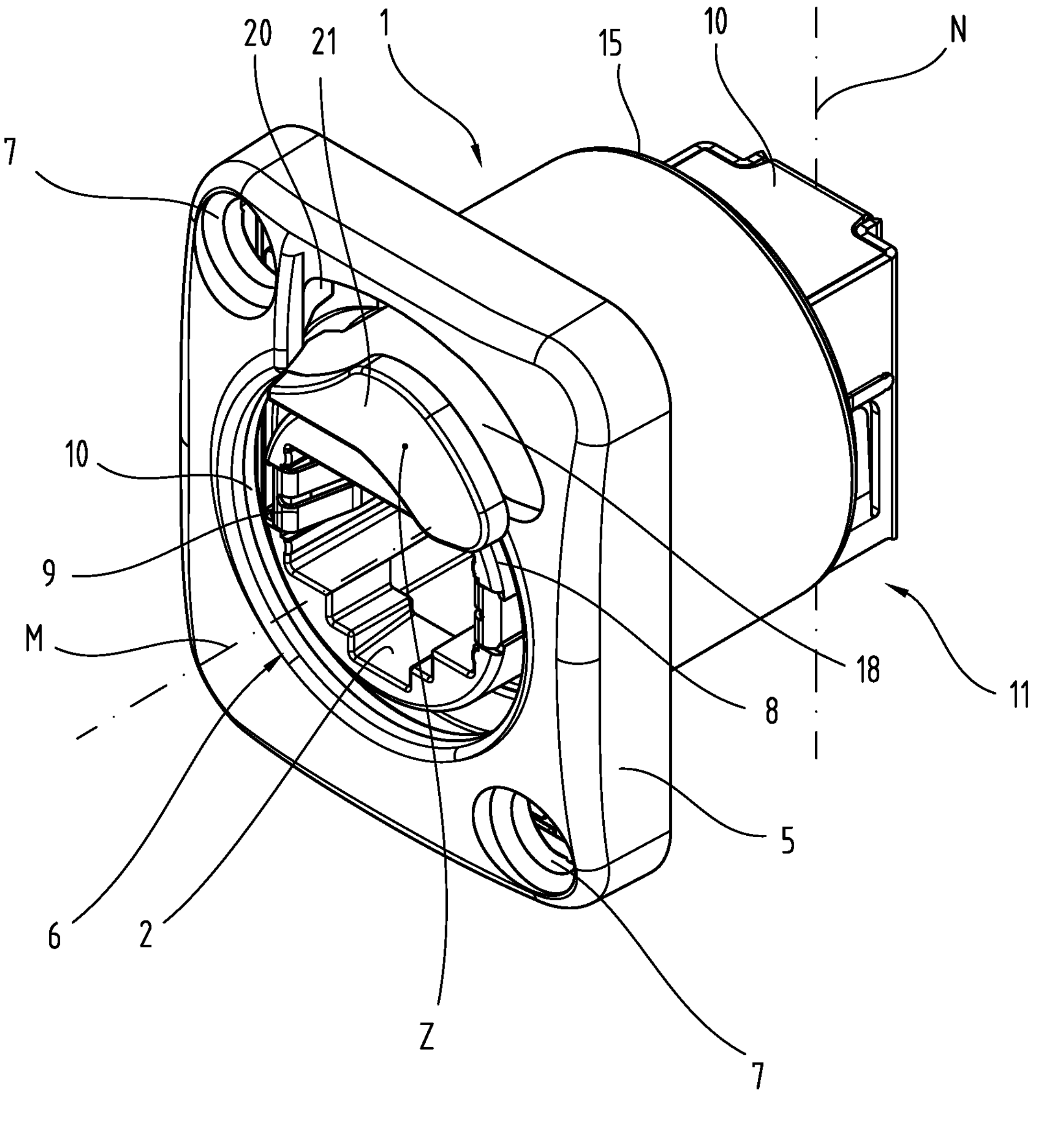
FIG. 1 shows a perspective view of a socket with the unlocking element according to the invention.

To begin with, it should be stated that, in the variously described embodiments, parts that are the same are provided with the same reference signs, or the same component designations, it being possible to transfer the disclosures present throughout the description analogously to the same parts with the same reference signs, or the same component designations. The positional indications chosen in the description, such as, for example, top, bottom, to the side, etc., refer to the figure being directly described and illustrated, and, when there is a change of position, these positional indications can also be transferred analogously to the new position.

The figures of the drawing show exemplary embodiments that are independent in themselves, the same reference signs or component designations being used for parts that are the same. The exemplary embodiments show possible configurational variants, the invention not being restricted to the configurational variants that are specifically illustrated, but rather various combinations of the individual configurational variants with one another are also possible and, on the basis of the teaching for technical action provided by the present invention, this possibility of variation is within the ability of a person skilled in the art working in this technical field. For the sake of good order, it should lastly be pointed out that elements have sometimes been illustrated not to scale and/or enlarged and/or reduced in size for the purpose of better understanding of the structure.

FIG. 1 illustrates, by way of example, a first embodiment of a built-in plug-in connector, also referred to as chassis socket, which, together with a complementary plug-in connector, in particular a cable connector, can form an electrical plug-in connection. The built-in plug-in connector according to the invention that is illustrated in FIG. 1 is designed to be coupled to a data plug, in particular an RJ45 data plug, and is illustrated in a perspective view. Of course, the structure according to the invention can also be transferred to other types of built-in plug-in connectors or couplers. The solution according to the invention can thus also be used for plug-in connectors as per the XLR standard, for phone jacks, for fiber optic plugs, for combinations of systems of this type, or the like.

Figure 2:
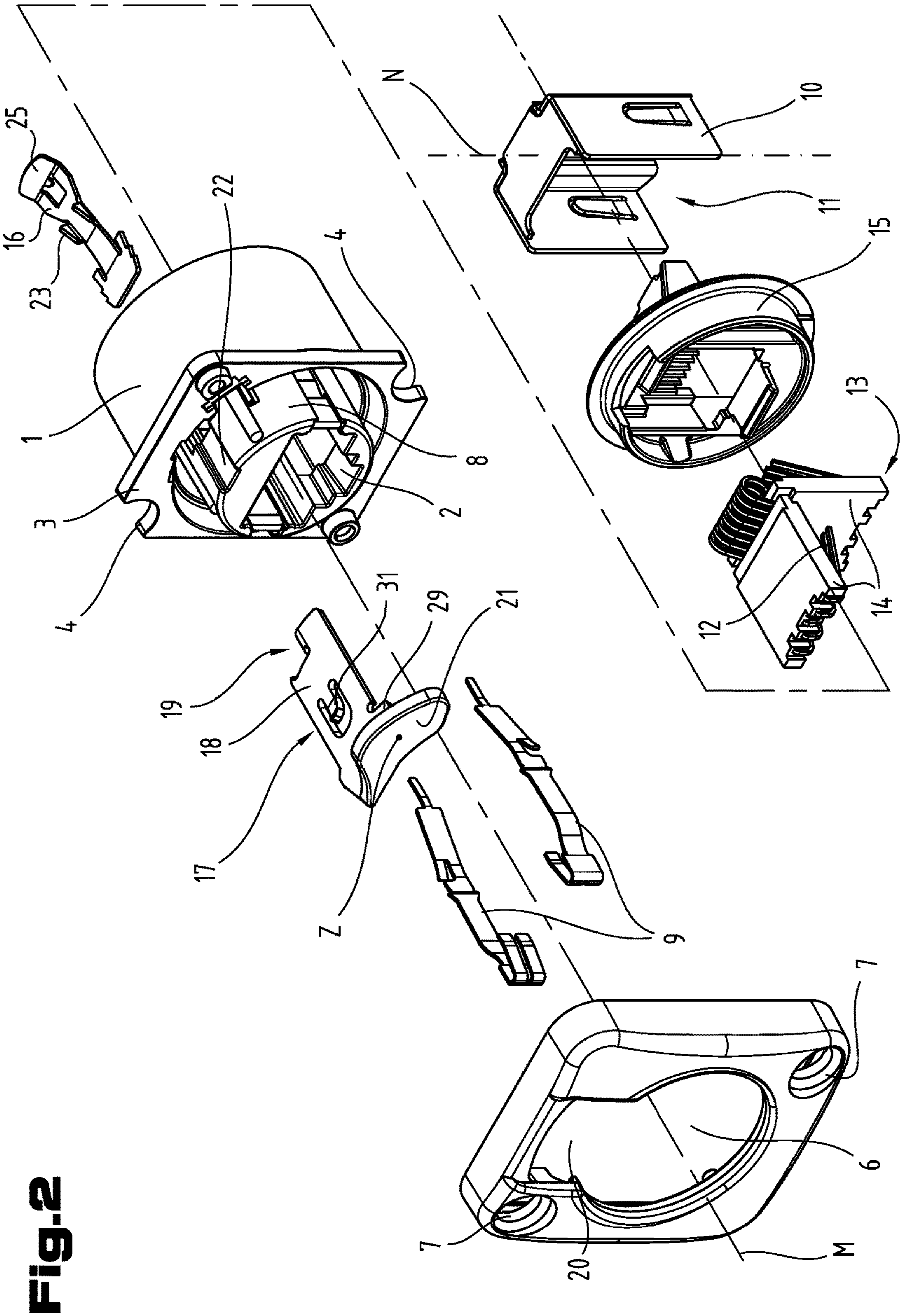
FIG. 2 shows an exploded illustration of the built-in plug socket of FIG. 1.

The electrical plug-in connector of FIG. 1, illustrated in detail in an exploded illustration in FIG. 2 with all the essential components or assemblies, comprises a housing 1 with a plug-in opening 2 for the complementary plug-in connector (not illustrated). As illustrated in the figures of the drawing, the housing 1 may comprise two concentric housing parts or form an annular gap as an additional annular plug-in opening for a socket-like plug extension of a complementary cable plug connector in another way. The annular gap is connected in the housing interior by an annular bottom 8.

At the end on the plug-in side, on the front side of the housing 1, there is provided a protruding connecting flange 3 which projects preferably at right angles from the housing 1 and preferably over its entire circumference. The connecting flange 3 also has passage openings or partially open recesses 4, through which fastening means, typically fastening screws, rivets or the like, for the built-in plug-in connector can be guided in order to fix the latter in a wall G of a unit, a switchboard or in similar elements. The center axis of the plug-in opening 2 preferably also constitutes the center axis and longitudinal axis of the housing or of the plug-in connector as a whole. Of course, other contour shapes of the connecting flange 3 are also possible, for example a circular contour, a polygonal chain, or the like. It is also possible for passage openings 4 to be present in all corners of the connecting flange 3.

The front side of the connecting flange 3 of the housing 1 is situated opposite a flange plate 5 on the plug-in side in the assembled state of the built-in plug-in connector. This flange plate has a plug-in opening 6 for the complementary plug-in connector in a coaxial arrangement with the plug-in opening 2 of the housing 1. It is furthermore the case that mounting bores 7 are machined out in the flange plate 5, are positioned coaxially with the recesses 4 in the connecting flange 3 and designed to guide through the fastening means for the plug-in connector for the purpose of connection to a wall of a unit, a switchboard or the like.

If need be, a preferably plate-shaped seal (not illustrated) may be provided, being inserted directly between the flange plate 5 and the connecting flange 3 of the housing 1 and held clamped between these components.

The housing 1 preferably integrally forms an inner contact carrier 8 which is concentric with the center axis M and in that case is manufactured from electrically insulating material. If need be, the contact carrier 8 may also be formed by a separate insert part, which is fixed in the housing 1 by any desired holding arrangements and consists of electrically insulating material, preferably plastic, and may preferably also have grounding contacts 9. In this case, housings 1 of metal or other electrically conductive materials are also possible. In the embodiment illustrated, a rear cap 10 is present in order to define a further plug-in opening 11. The housing 1 may, however, also be completely closed at the rear.

However, the contact carrier 8 also receives the electrical contact elements 12, which serve to produce the electrically conductive connection to the complementary plug-in connector that is plugged in. These contact elements 12 are for example part of a contact set 13, which also has at least one insulating body 14 of electrically insulating material in its central portion, which fixes the contact elements 12 and their opposite ends. In the embodiment of the chassis socket illustrated, the contact elements 12 are guided back out again at the rear end of the housing 1 through a housing cover 15. The contact elements 12 could, however, also be guided through the housing cover 15 to a circuit board, to which or in which they are soldered.

In or on the housing 1 there is also positioned a locking arrangement 16, 17, the at least one locking arm 16 of which can also be unlocked again by means of an unlocking element 17. This unlocking element 17, conventionally a stamped and bent part, preferably having a flat or slightly curved center piece as connecting portion 18 between the end with an actuating portion 19, protrudes to the front beyond the end of the housing 1 on the plug-in side, in order that it can be reached and actuated readily by the user. At the location at which the unlocking element 17 is arranged, a radially outwardly oriented recess 20, through which the unlocking element 17 can project beyond the front side of the flange plate 5, preferably extends from the plug-in opening 2 of the housing 1 and also from the plug-in opening 6 of the flange plate 5.

A actuating tab 21 which can be manually handled easily, in the exemplary embodiment shown is at right angles to the center axis M of the housing 1 and also the longitudinal center axis L of the unlocking element 17 and is curved about an axis oriented transversely to the center axis M of the housing 1 and also the longitudinal center axis L of the unlocking element 17 (see FIGS. 4 to 9 in this respect), is preferably present on the front end of the unlocking element 17, opposite the actuating portion. At least this actuating tab 21 of the unlocking element 17, which, when used as intended, is touched by the user and the size and shape of which is designed for that purpose, is covered with electrically insulating plastic or a material with a similar action or is produced from this insulating material. If need be, the unlocking element 17 may also predominantly, for example the actuating tab 21 and the center part or connecting portion 18, or preferably even entirely, be covered with or produced from the electrically insulating plastic. Manufacturing or covering at least the actuating tab 21 from or with the electrical insulation material prevents rapid discharge through an electrostatically charged person or object who or which actuates or touches the unlocking element 17, and as a result prevents damage in microelectronic components or integrated circuits of the plug-in connector or downstream systems.

Preference is given to an embodiment of an unlocking element 17 in which the center point Z of the actuating tab 21 and a longitudinal center axis L of the connecting portion 18 are offset with respect to one another radially in relation to this longitudinal center axis L. The present figures of the drawing depict an actuating tab 21 which is angled away—as viewed from the front—to the right. Nevertheless, it is of course also possible to provide an angling-away to the other side with respect to the vertical longitudinal center plane. The center point Z may be determined as the surface centroid, for example. This asymmetrical shape of the front end of the unlocking element 17, with various contour shapes—rounded, circular, elliptical, kidney-shaped, with a polygonal-chain edge, etc.—and sizes being possible, contributes to reducing the overall structural height of the plug-in connector, and thus obtaining a space-saving structure, in the case of generally routine positioning in the uppermost region of the housing 1, preferably exactly in the longitudinal center plane of the housing 1 or of the contact carrier 8. Built-in plug sockets in this configuration may be installed next to one another or one above another very closely whilst still greatly facilitating the unlocking, in particular in the case of plug sockets situated one above another.

The elastic locking arm 16, which on its side facing away from the central longitudinal axis M of the housing 1 has at least one locking structure, here in the form of two locking projections 23 which are lug-like in a side view and are curved upward on the outer edge of the predominantly flat locking arm 16, is preferably mounted on or in the contact carrier 8, preferably fixed in an elongate recess 22 on the top side. By way of these locking projections 23, in the plugged-in state of a complementary plug-in connector plugged in the plug-in opening 2, the locking arm 16, preferably likewise positioned in the longitudinal center plane of the contact carrier 8, engages in corresponding complementary locking structures of this plug-in connector.

Figure 3:
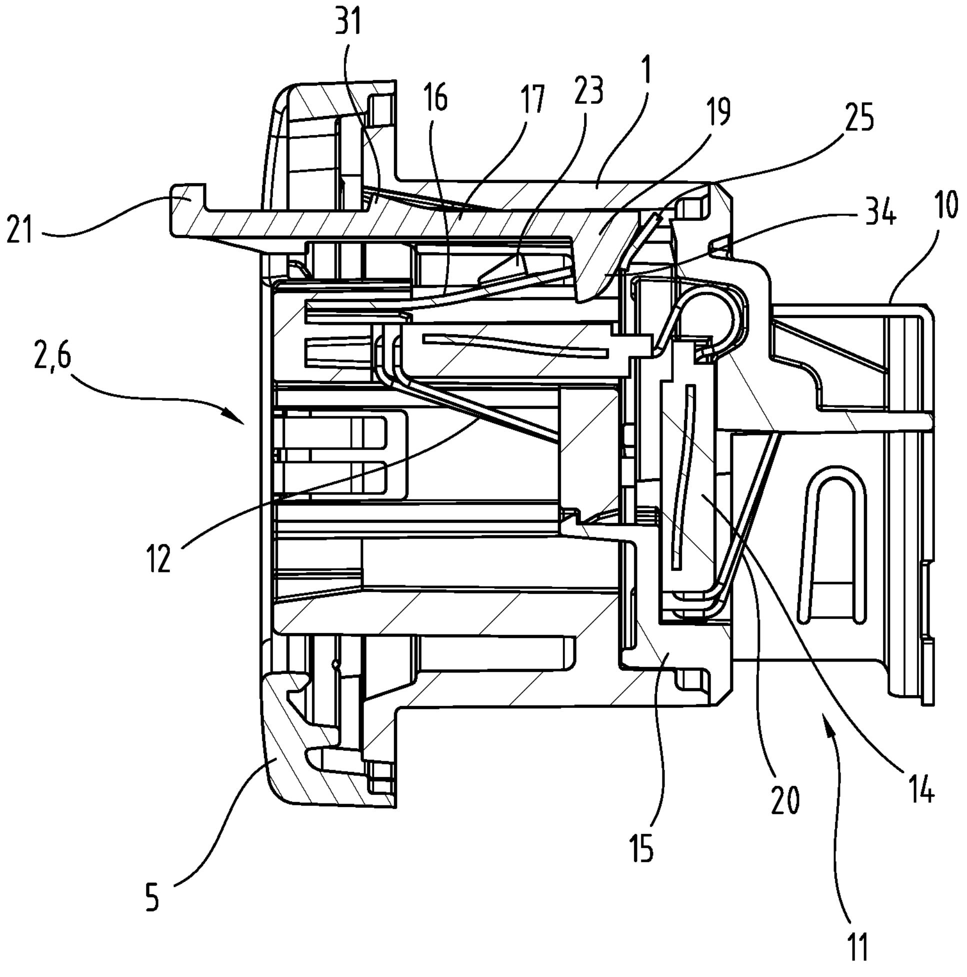
FIG. 3 shows a longitudinal section along the vertical center plane of the socket of FIG. 1.
Figure 4:
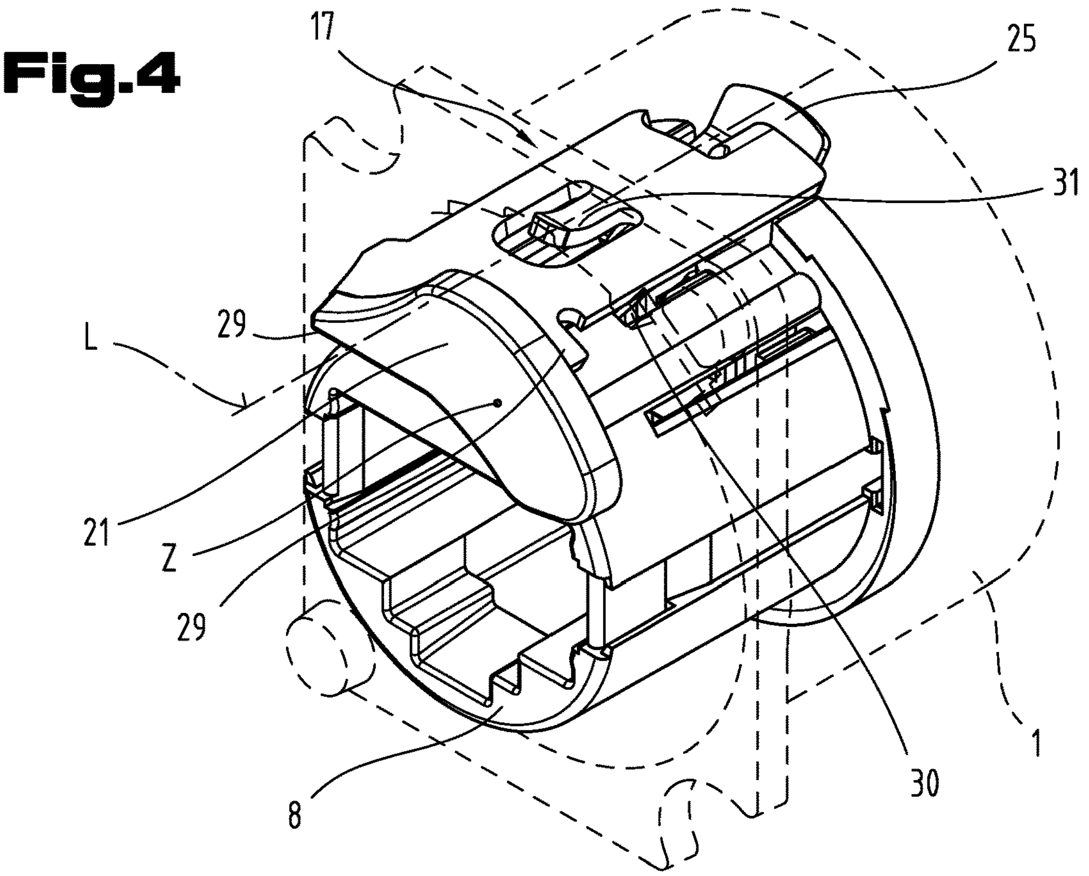
FIG. 4 shows a perspective view of a preferred embodiment of the contact carrier and of the unlocking element of the locking device of the plug socket of FIG. 1.
Figure 5:
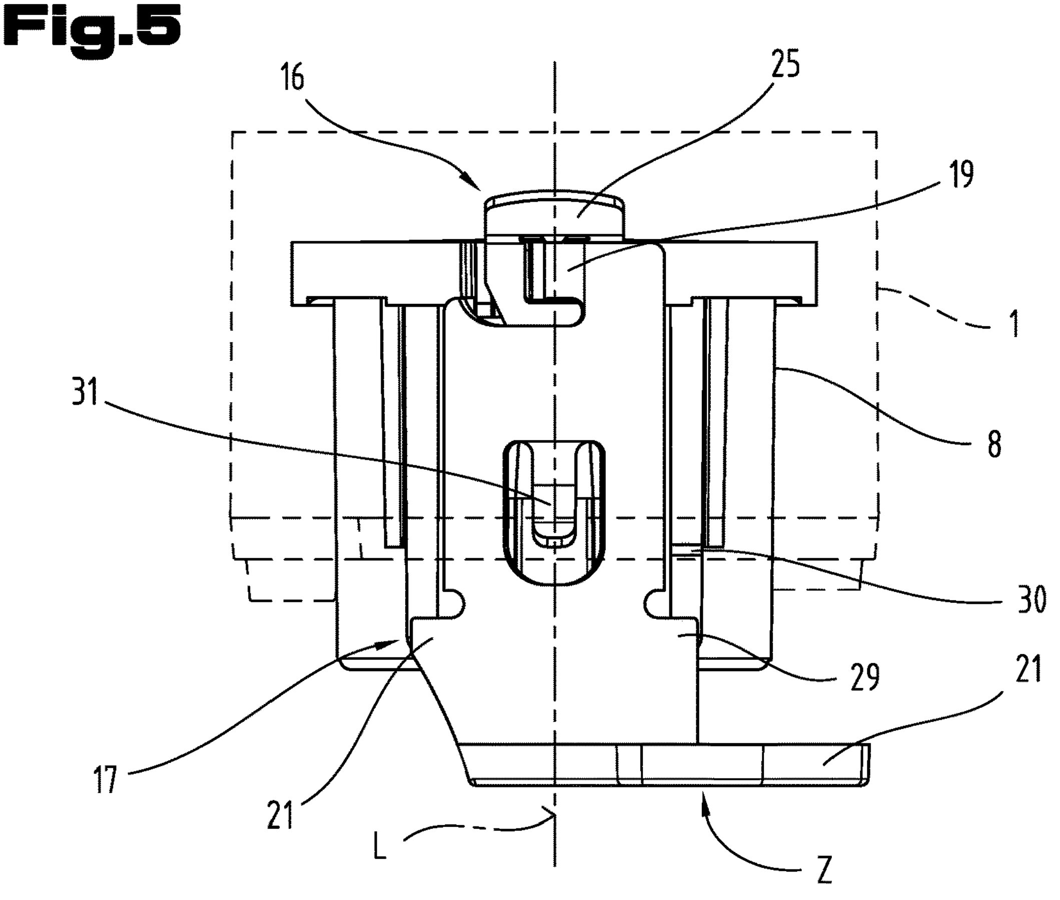
FIG. 5 shows the contact carrier and the unlocking element of the locking device of the plug socket of FIG. 1, in a plan view of the unlocking element in a radial direction.

In order to bring the locking arm 16 out of engagement with the locking structure of the plug-in connector that has been plugged in and to release it so that it can be pulled out of the plug-in opening 2, the unlocking element 17 can be displaced rearwardly parallel to the longitudinal center axis M of the housing 1 and of the contact carrier 8 from a passive position, which is illustrated for example in FIG. 1 or 3 of the drawing and in which it protrudes to the front beyond the housing 1 to a maximum extent, into an active position. To that end, the unlocking element 17 is displaceably mounted on the contact carrier 8 or the housing 1, preferably above the locking arm 16 and preferably likewise in the recess 22 of the contact carrier 8, in order as a result to ensure the optimum guidance of locking arm 16 and unlocking element 17 relative to one another.

When the unlocking element 17 is being displaced from the passive position into the active position, an actuating portion 24 on the unlocking element 17 acts on preferably an oblique surface 25 in the form of an unlocking surface of the locking arm 16 and bends it in the direction of the central center axis M of the housing 1 and of the contact carrier 8, as a result of which the locking projections 23 come out of engagement with the locking structure of the plug-in connector that has been plugged in and thereby releases it for the purpose of being pulled out of the plug-in opening 2. Irrespective of the shape of the locking arm 16, the oblique surface 25 is preferably located at its end opposite the plug-in opening 2. If the unlocking element 17 is released again by the user, the resiliently elastic or spring-loaded locking arm 16 moves back into its initial position again, and also displaces the unlocking element 17 back into its passive position again in the process.

The locking arm 16, which runs substantially in a straight line over the majority of its length in the exemplary embodiment of FIG. 2, may preferably consist of metal. The locking arm 16 is preferably also partially covered with, partially consists of, or entirely consists of an electrically insulating material. In this case, insulating plastic, which also ensures the necessary elasticity for the locking arm 16, is preferably selected. When partial coating or production is provided, the portions that come into contact or are in contact with the unlocking element 17 are preferably configured correspondingly, in particular the oblique surface 25 and at most also the adjoining portions as well.

In the exemplary embodiment of FIGS. 2 to 5, the locking arm 16 extends from its fastening point in the front region of the contact carrier 8, close to the plug-in opening 2, in the direction of the rear end of the housing 1. An opposite installation direction, in which the deflectable end of the locking arm 16 extends in the direction of the plug-in opening 2, would also be possible. Other shapes for the locking arm 16 are also possible, for example the shape curved in the manner of a U that is shown in FIGS. 14 to 17, in which a straight leg 26 of the U-shaped locking arm 16 rests on the contact carrier 8 and is supported there. The curved leg 28, which adjoins the curved portion 27, situated at the front, of the locking arm 16, with the locking projections 23 and the oblique surface 25 is curved toward the rear by 180 degrees.

Figure 6:
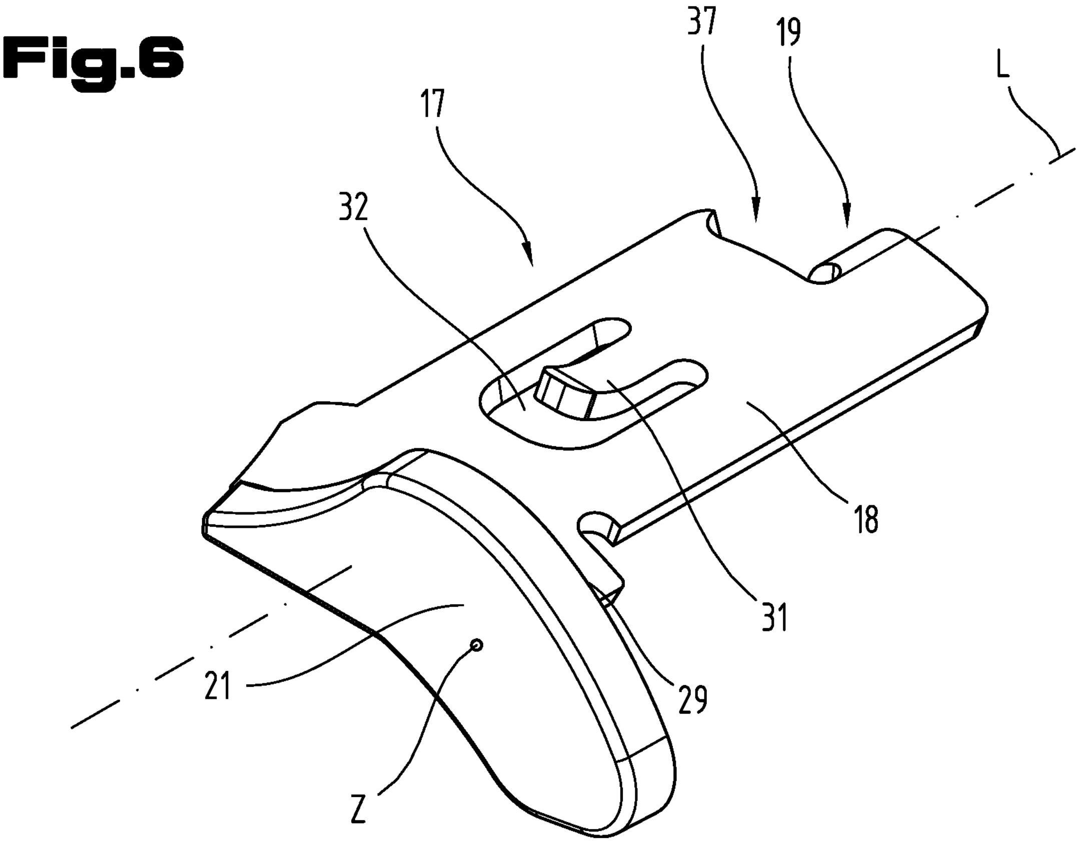
FIG. 6 shows the unlocking element of the embodiment of FIGS. 1 to 5 in a perspective view from the front.
Figure 7:
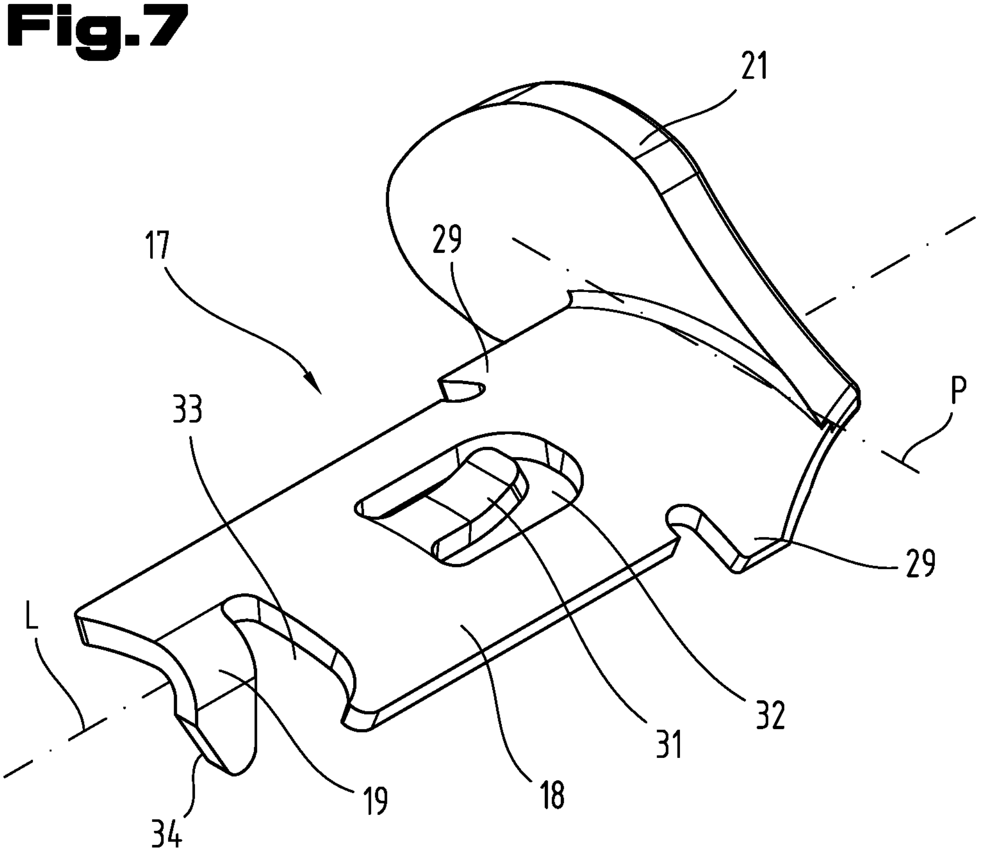
FIG. 7 shows the unlocking element of the embodiment of FIGS. 1 to 5 in a perspective view from the rear.
Figure 8:
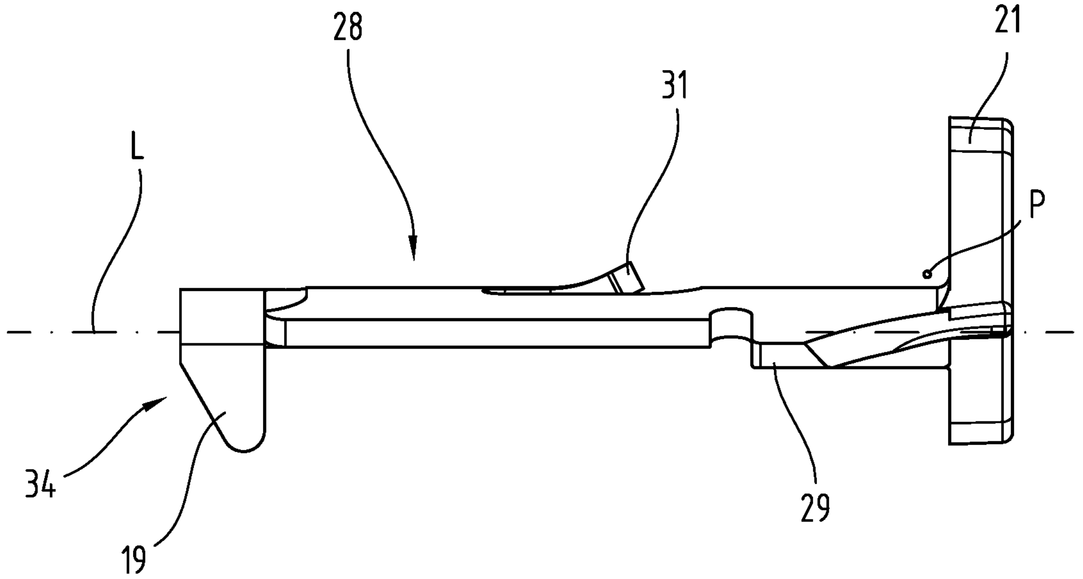
FIG. 8 shows the unlocking element of the embodiment of FIGS. 1 to 5 in a side view.
Figure 9:
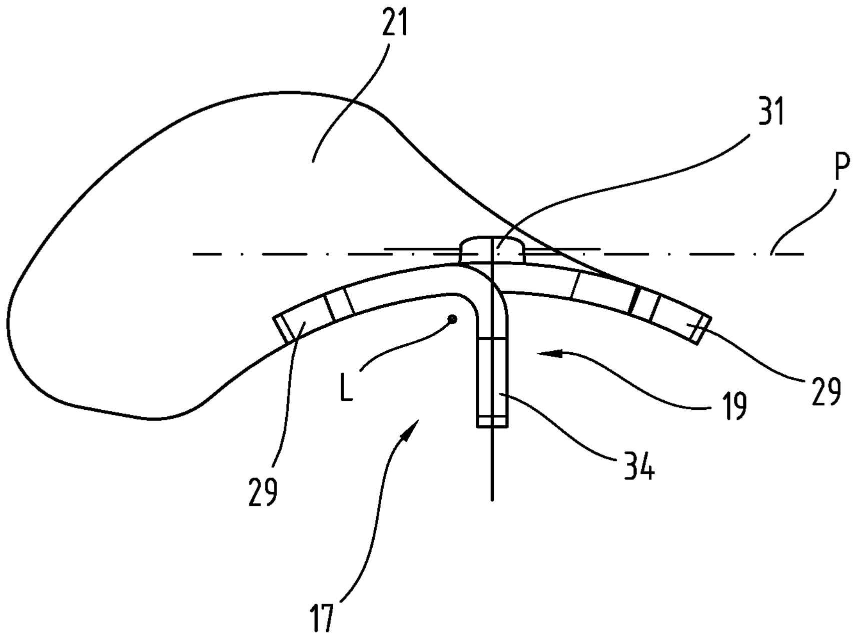
FIG. 9 shows the unlocking element of the embodiment of FIGS. 1 to 5 in a view from the rear.

In order to obtain a particularly short structure of the electrically insulating unlocking element 17 and thus of the entire plug socket, the actuating portion 19 is arranged at the outermost rear end of the unlocking element 17. As can be seen in FIGS. 6 to 8, no other portion of the unlocking element 17 protrudes rearwardly, i.e. in the direction of its longitudinal center axis L, in the direction of the longitudinal center axis M of the housing 1, and in the direction of the displacement from the passive position into the active position, beyond the actuating portion 19. The rear edge of the actuating portion 19 forms here, preferably together with its base portion on the unlocking element 17, the rear end boundary face or end face of the unlocking element 17.

As can be seen in FIGS. 6 to 9, the unlocking element 26 preferably has two tabs 29 projecting away laterally from the substantially flat or slightly curved central part 18. It would also be possible to provide an increase in cross section of this type or another type of increase in cross section only on one side. These tabs 29, which are preferably in the front portion, close to the plug-in opening 2, or other types of increases in cross section interact with at least one corresponding stop 30 or another type of reduction in cross section on the housing 1 in the displacement travel of the unlocking element 17 from its passive position P into the active position A, which reduction in cross section if need be can be machined out integrally with the housing 1 or mechanically connected thereto as a separate element. This system of tabs 29 and stops 30 delimits the working travel of the unlocking element 17 from the passive position P into the active position A, since further movement in the same movement direction is prevented by the tab 29 bearing against the stop 30. This therefore also prevents the actuating portion 19 from being able to be displaced from its position when the unlocking element 17 is in the passive position P still further toward the active position A, and then moving past the rear end of the locking arm 16, in particular the rear boundary of the oblique surface 25. It is thus possible to securely prevent the actuating portion 19, from the active position of the unlocking element 17, from passing still further behind the end of the locking arm 16 and thus remaining non-releasably stuck in this position.

The travel between the passive position and the active position could also be delimited by the actuating tab 21 coming to bear by way of its rear side against the front end wall of the housing 1.

In a manner corresponding to the embodiment of the invention illustrated in FIGS. 2 to 9 of the drawing, the actuating portion 19, which, similarly to the actuating tab 21, is coated with or manufactured from an electrically insulating material, preferably a plastic, is formed by at least one tongue, which is curved about a bending axis oriented parallel to the longitudinal center axis L of the unlocking element 17 or the longitudinal center axis M of the housing 1. This bending axis is preferably in the plane of the unlocking element 17, coaxial with the longitudinal axis L through the flat or slightly curved connecting portion 18 of the unlocking element 17. The actuating portion 19 preferably has a bevel on its rear side. as a result of its open shape, the rear end of the unlocking element 17 is also easy to produce, since mechanical or manual outlay for separating parts that have become caught in one another in the hopper of the manufacturing installation can be avoided. Deviations of the bending angle when the actuating portion 19 is being bent about the longitudinal axis of the unlocking element 17, i.e. parallel to the direction of the relative displacement of the unlocking element 17 and the locking arm 16, also have only a slight effect on the radial dimension of the actuating portion 19. The same applies for the production of the entire unlocking element 17 from preferably electrically insulating plastic in the case of casting or injection molding. Therefore, even in the case of a relatively great variation the bending angle during manufacture, deflection of the locking arm 16 that is always sufficient for unlocking the plug-in connection is still ensured, thereby leading to reproducible functional reliability and quality of operation.

The oblique surface 25 on the locking arm 16 is preferably arranged in its rear portion in order also to be able to keep this component short whilst still providing a lever action sufficient for it not to be necessary to apply excessive force to displace the unlocking element 17 from the passive position into the active position. For the locking arm 16, too, it therefore advantageously applies that no portion of the locking arm 16 protrudes rearward beyond the unlocking surface. It is also particularly advantageous for a short structure of the plug-in connector housing 1 in the plug-in direction here when no portion of the unlocking element 17 protrudes beyond the active oblique surface 25 either, even if the unlocking element is displaced into the active position to its maximum extent.

Instead of interacting oblique surfaces on the unlocking element 17 and the locking arm 16, it would also be possible for only one of these components to have such an oblique surface and the other one of these two parts to have a projection interacting with the oblique surface. It would also be possible for a separate resiliently elastic element, which loads the locking arm 16 into the locked position, to be present and/or for a further resiliently elastic element to be present, in order to push the unlocking element 17 back into the passive position when it is released by the user. Instead of a resiliently elastic design of the locking arm 16, it could also be mounted pivotably on the contact carrier 8 and be loaded by a separate spring element into the position in which it engages in the locking structure of the complementary plug-in connector that has been plugged into the housing 1.

As can be clearly seen in FIG. 3, the housing 1 of a plug-in connector in the form of a plug socket or chassis socket has an inside length to the rear cover 15 which coincides with the rear end of the locking arm 16 or with the rear end of the unlocking element 17 in its maximum active position, in which it is displaced rearward to the fullest extent. This makes it possible to produce substantially smaller housings 1 and therefore plug sockets with a very small installation depth in the plug-in direction. This applies in particular to the embodiment illustrated by way of example in FIGS. 1 to 3 of the drawing, in which embodiment a further plug socket, the plug-in axis N of which is oriented transversely to the longitudinal center axis M of the housing 1 or transversely to the plug-in axis of the first plug-in opening 2, with a plug-in opening 11 is arranged on the rear side of the housing 1.

In its passive position, the unlocking element 17 is preferably secured against further forward displacement in the direction of the plug-in opening 2 by a stop element 31 interacting with the contact carrier 8 and/or with the housing 1. This stop element 31 is preferably a stamped-out tongue, which extends in the longitudinal direction of the unlocking element 17 and is curved up at the front, i.e. close to the plug-in opening 2, upward out of the plane of the central portion of the unlocking element 17. A cutout 32 is provided between the stop element 31 and the flat or slightly curved central connecting portion 18 of the unlocking element 17.

In the same way, according to one advantageous embodiment of the unlocking element 17, it is also possible to provide a further cutout 33 between the flat or slightly curved central connecting portion 18 of the unlocking element 17 and the actuating portion 19. However, both the actuating portion 19 and the stop element 31 may also be machined out of the unlocking element 17 without cutouts, for instance by die cutting. As is shown in the exemplary embodiment of FIGS. 13 to 17, both the actuating portion 19 and the stop element 31 may in the form of an integrally molded elevation at the end or on the top side of the connecting portion 18. Furthermore, these structures 19 and 31 could also be separate manufactured components which are connected to the unlocking elements 17 in any desired way that is adapted to requirements.

A further advantageous embodiment of a built-in plug-in connector according to the invention is illustrated in FIGS. 10 to 13.

An electrically insulating contact carrier 8 is inserted in a housing 1 with a plug-in opening 2 for a complementary cable plug connector. The contact elements 17 fixed in the contact carrier 8 protrude into the plug-in opening and are guided out on the rear side of the housing 1. In this respect, the contact carrier 8 may again be an integral part or portion of the housing 1, which in that case likewise consists of electrically insulating material, but may also be configured as a separate part and inserted and fixed in a corresponding receptacle in the housing 1. In this latter type of construction, the housing 1 is typically manufactured from metal and only the contact carrier 8 consists of insulating material, preferably plastic.

Figure 10:
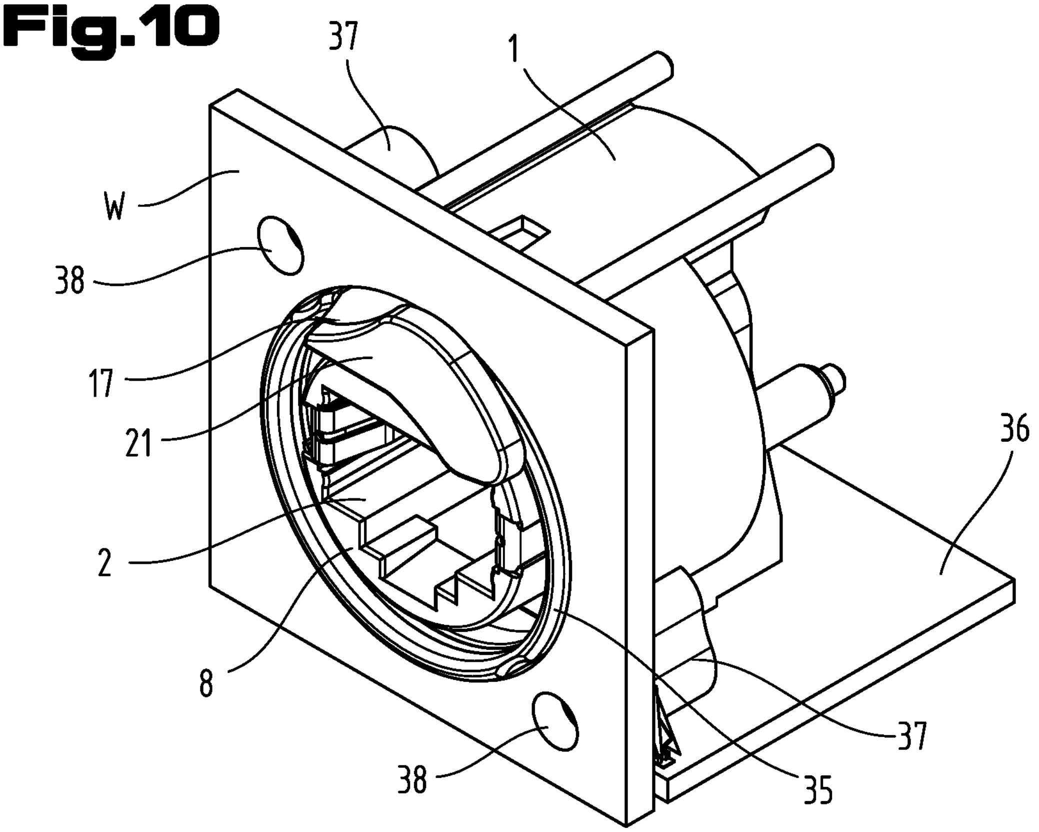
FIG. 10 shows a perspective view of a further embodiment of a built-in plug socket with a luminous ring and the unlocking element according to the invention.
Figure 11:
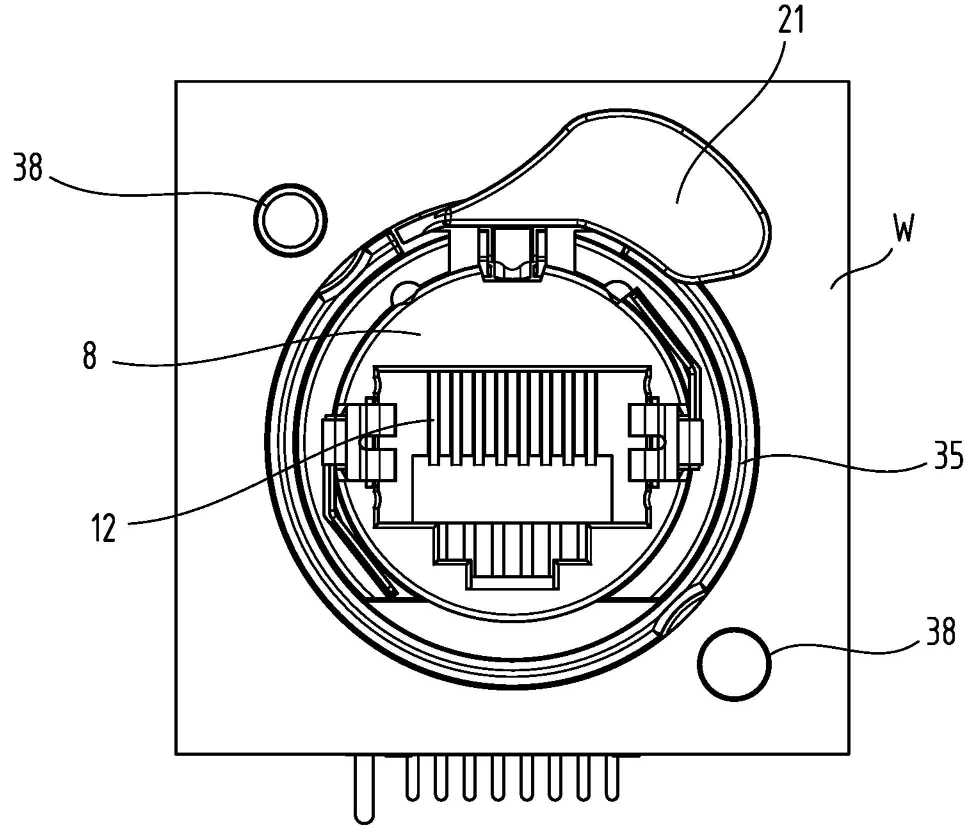
FIG. 11 shows the socket of FIG. 11 in a view from the front.
Figure 12:
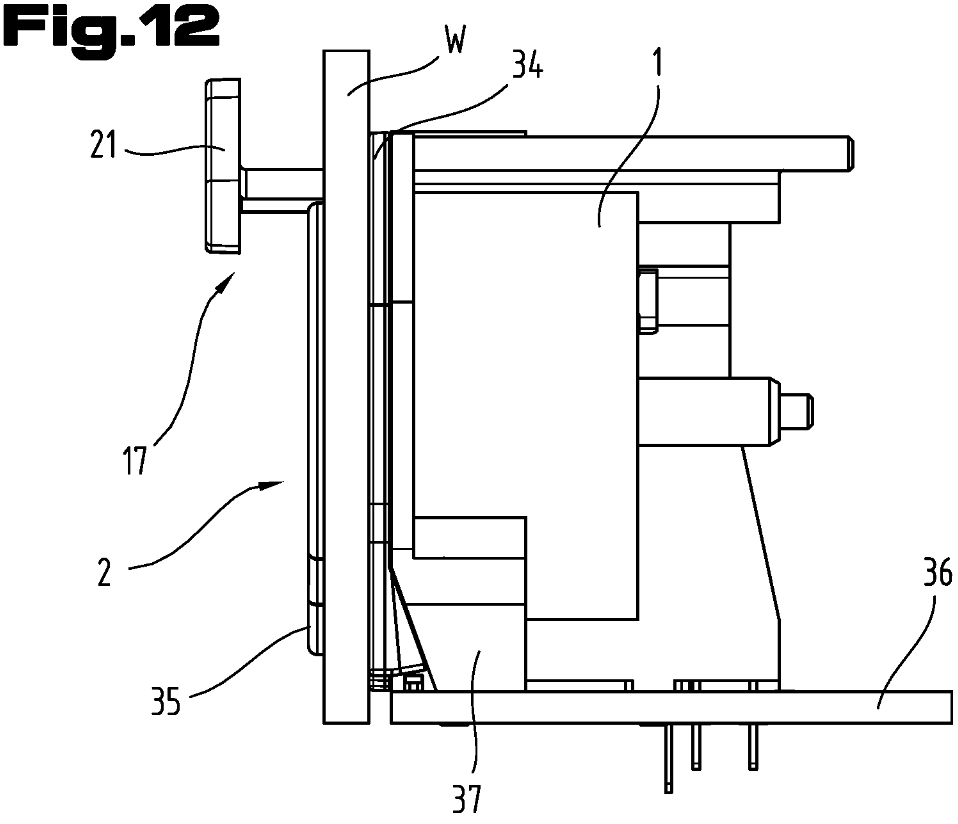
FIG. 12 shows a side view of the socket of FIG. 11.
Figure 13:
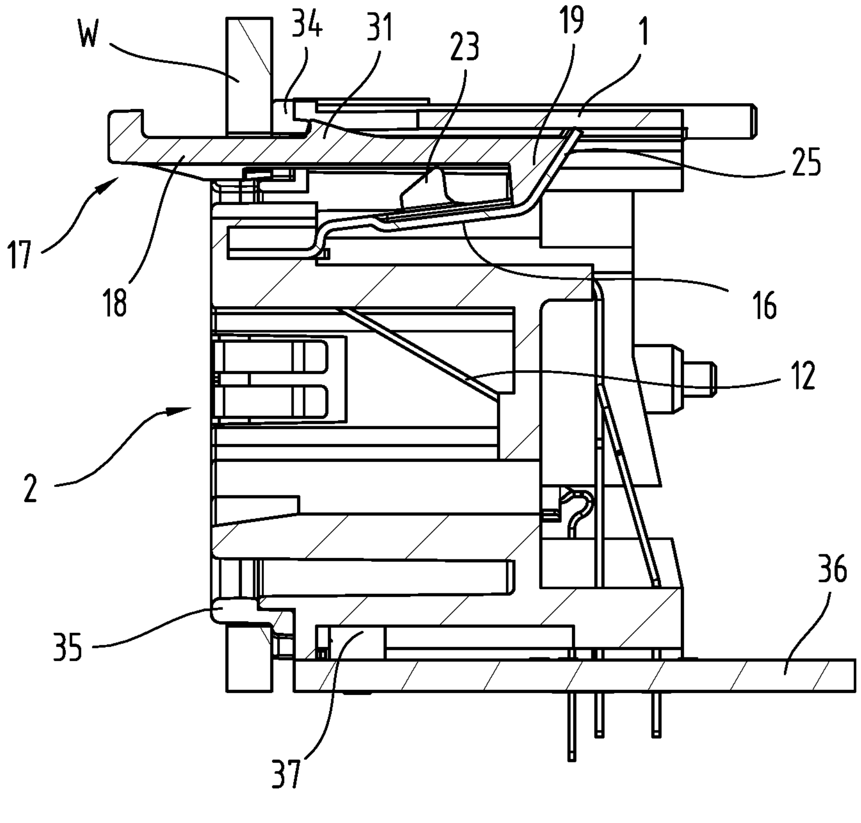
FIG. 13 shows a longitudinal section along the vertical center plane of the socket of FIG. 1.
Figure 14:
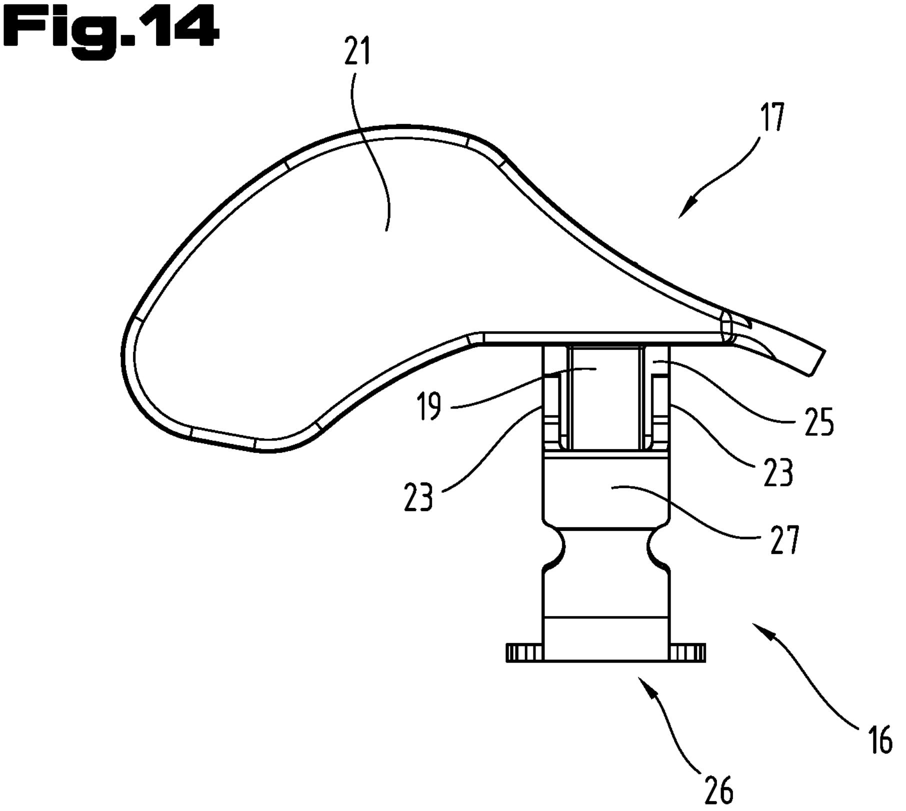
FIG. 14 shows an unlocking element and a locking arm in another embodiment according to the invention in a view from the front.
Figure 15:
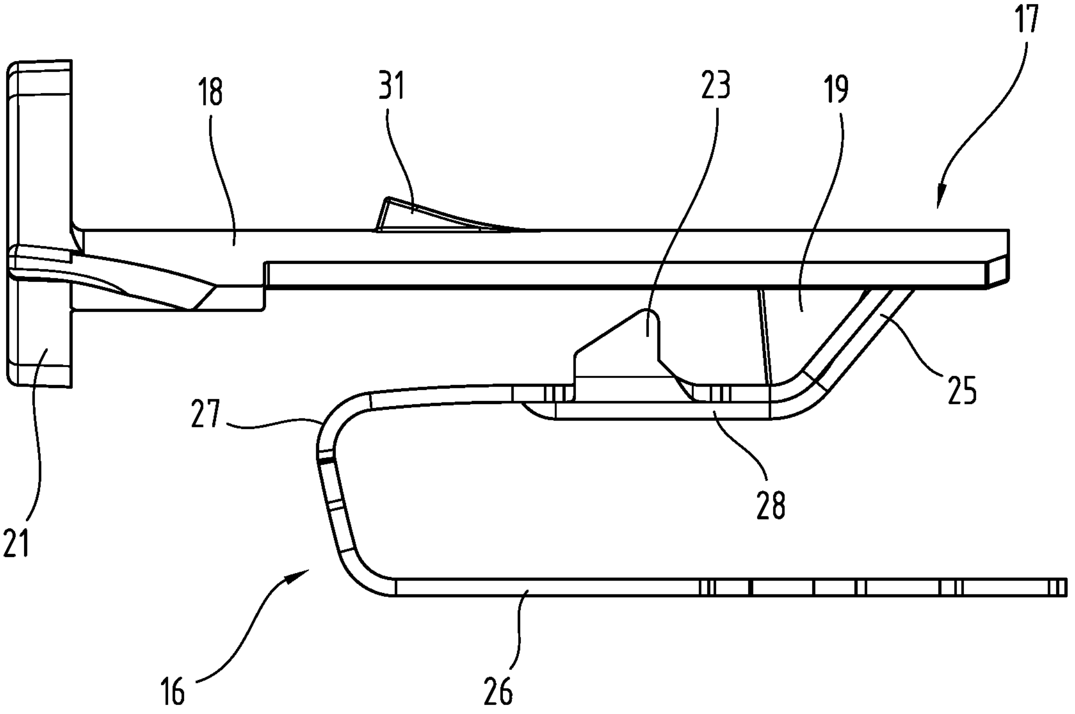
FIG. 15 shows the arrangement of unlocking element and locking arm of FIG. 15 in a side view.
Figure 16:
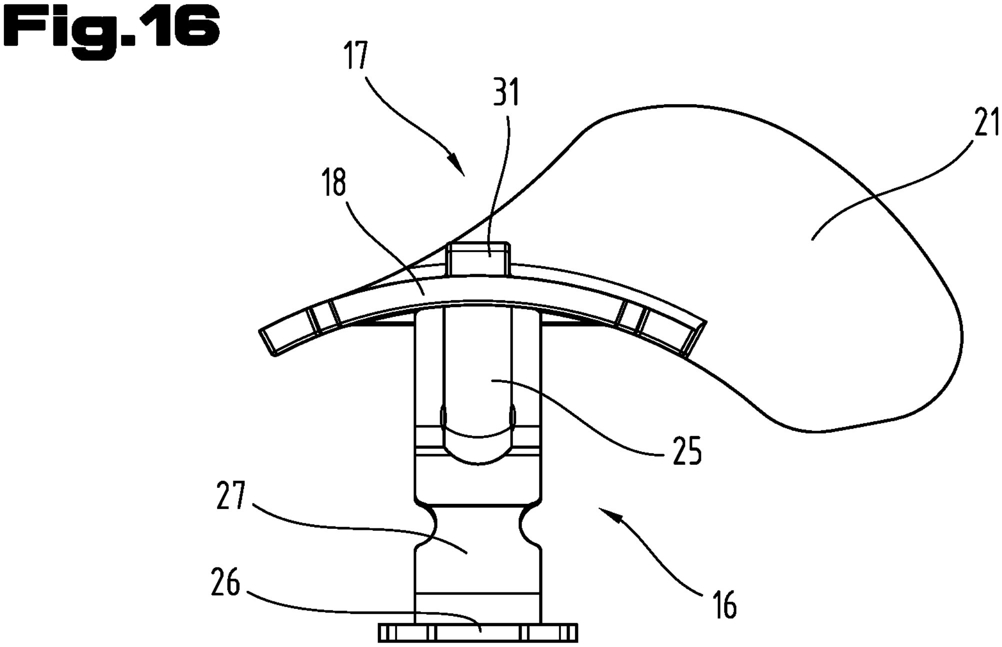
FIG. 16 shows the arrangement of unlocking element and locking arm of FIG. 15 in a view from the rear.
Figure 17:
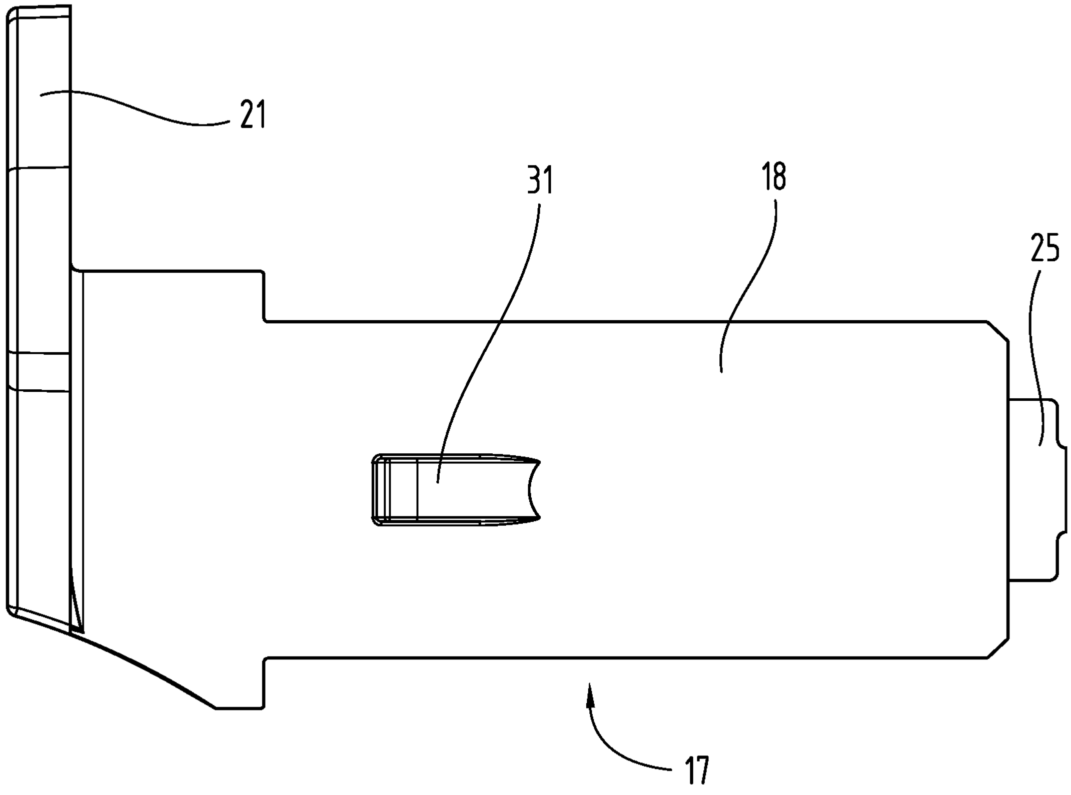
FIG. 17 shows the unlocking element of FIG. 15 in a view from above.
Figure 18:
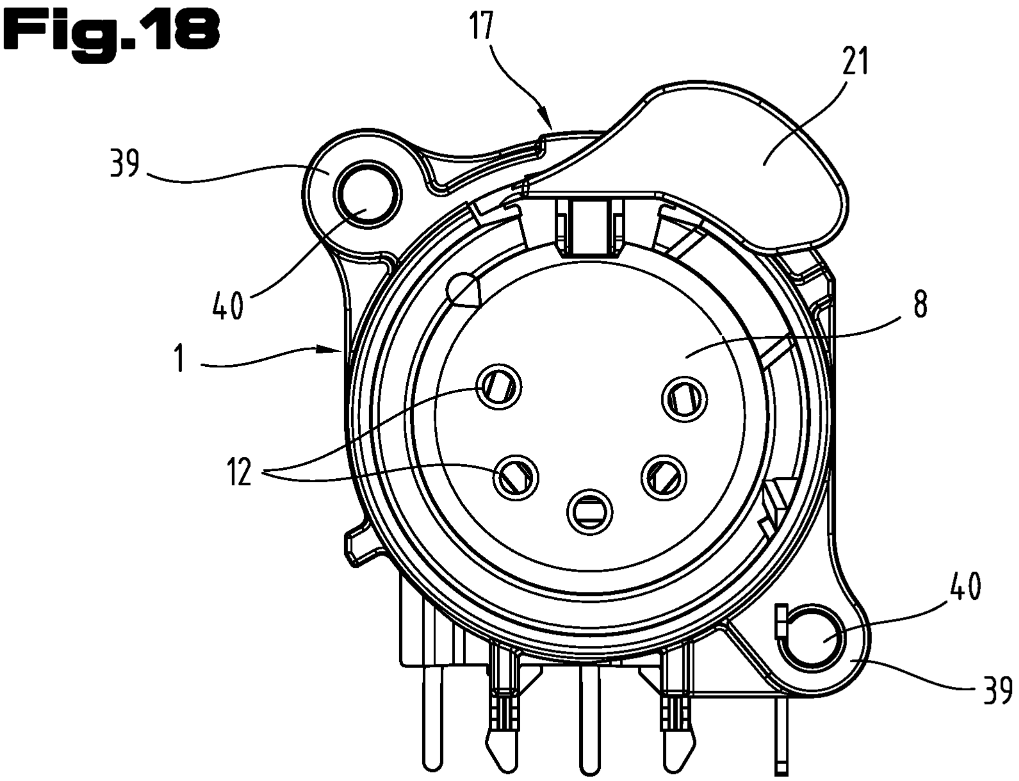
FIG. 18 shows a view of a further embodiment of a built-in plug socket in a view from the front.
Figure 19:
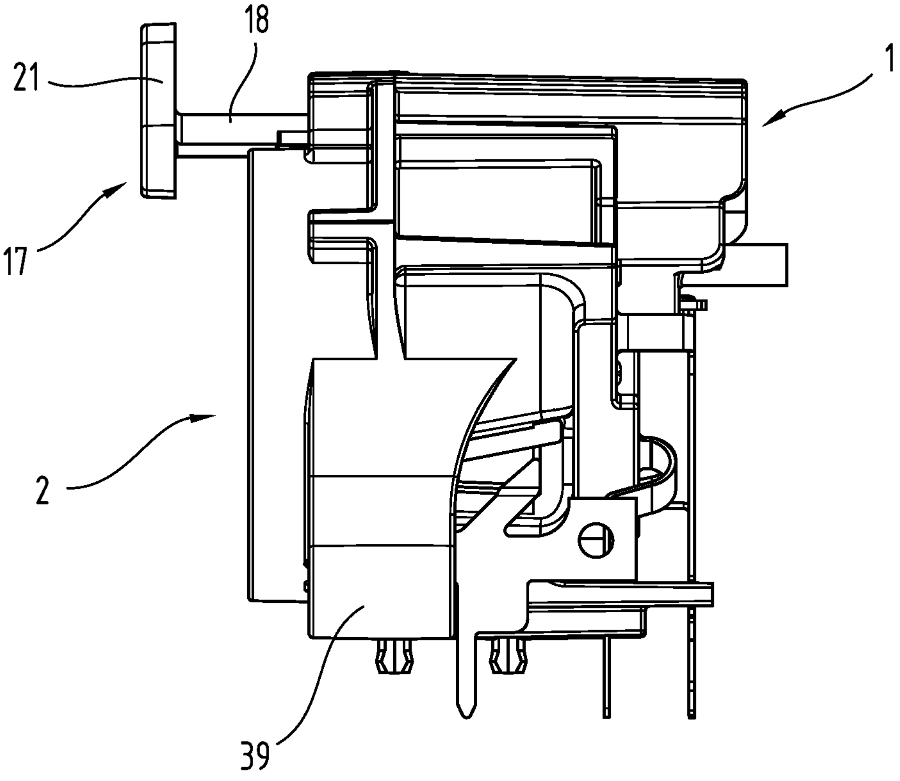
FIG. 19 shows a view of the socket of FIG. 19 from the side.
Figure 20:
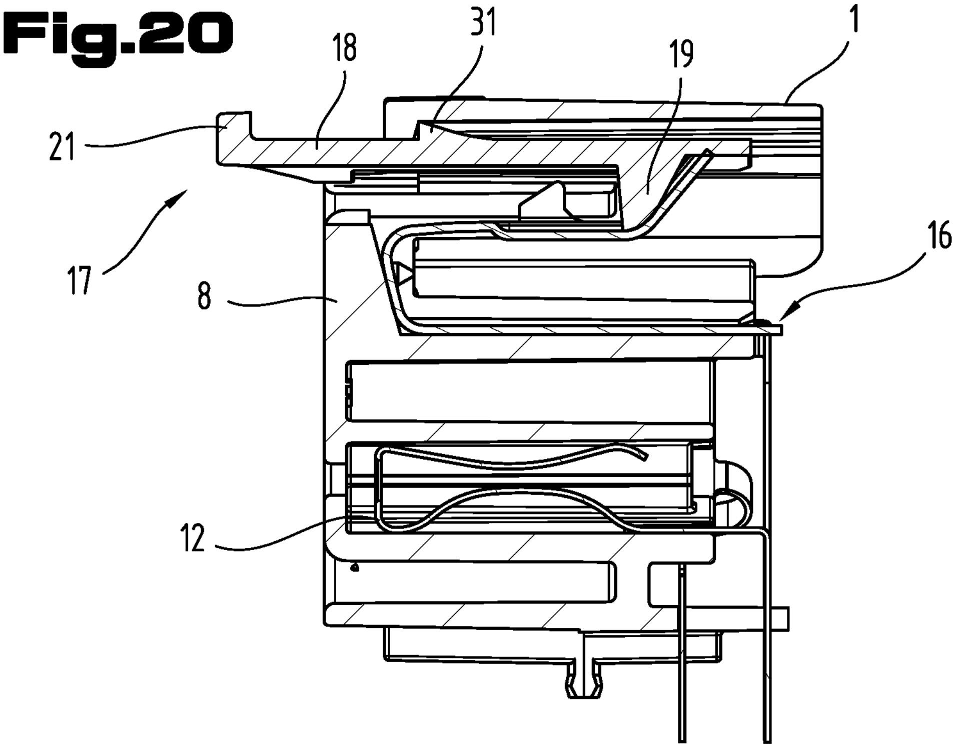
FIG. 20 shows a longitudinal section along the vertical center plane of the socket of FIG. 19.
Figure 21:
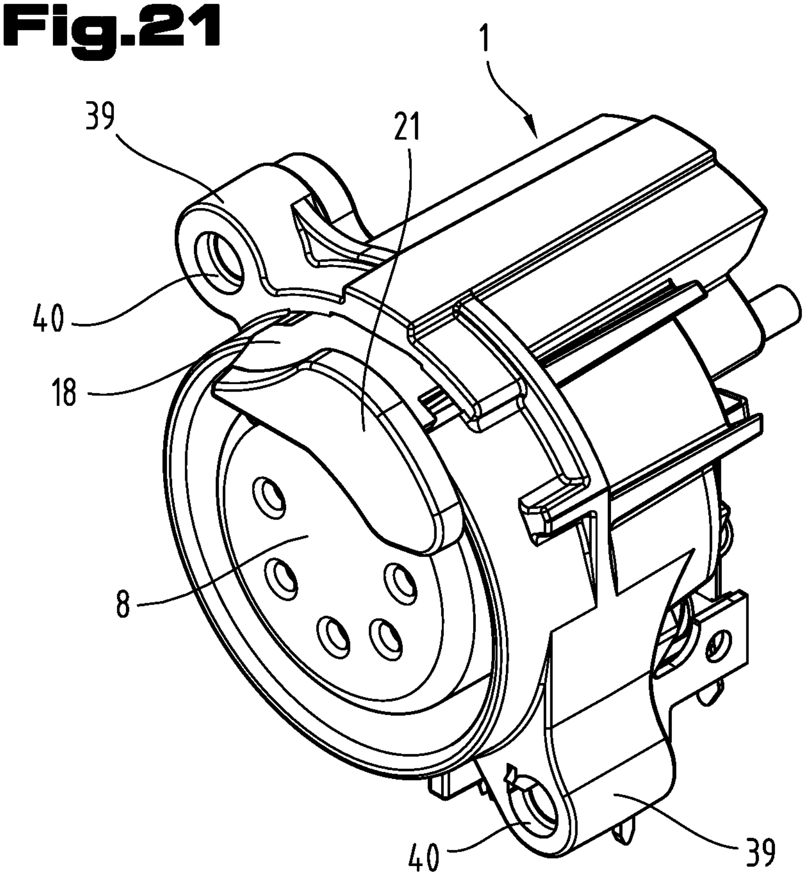
FIG. 21 shows a perspective view of the socket of FIG. 19.

A front plate 34 is arranged on the front side of the housing 1, concealed by a detail of the wall W of a unit, a switchboard or the like in FIGS. 10 and 11, and surrounds the front portion of the contact carrier 8. The front plate 34, which can be seen better in FIGS. 12 and 13, preferably has a web 35 around the circumference that projects forwardly and runs along at least part, preferably most, of the circumference of the plug-in opening 2 and in the process forms the front end and the outer boundary of the plug-in opening 2. FIGS. 10, 12 and 13 lastly also illustrate a printed circuit board or circuit board 36, here arranged horizontally, as an example that a built-in plug-in connector may also be present in a printed circuit board configuration.

In the exemplary embodiment illustrated in FIGS. 10 to 13, the front plate 34 is manufactured from a light-scattering or light-conducting material, into which light from an external light source can be coupled via at least one coupling-in surface. Since this embodiment is intended for being built into units or switching cabinets, switchboards or the like from the rear side, at least the housing 1 has mounting portions 37 along the circumference in which mounting bores are preferably machined out, in order to fasten the arrangement to the wall W of the unit or the switchboard or the like. There are preferably also coaxial mounting bores on the front plate 34 at corresponding locations to the mounting portions 37, similarly to how mounting bores 38 are present in the wall W.

The light source for the light to be coupled into the front plate 34 via the coupling-in surfaces is preferably mounted on the printed circuit board or circuit board 36. The actual illumination means, preferably LEDs or OLEDs, is preferably arranged directly adjacent to the coupling-in surface here. The control of the light source and supply of energy to the light source, both of which are realized by cables or conductive tracks on the circuit board 36, remain separate from the contacts 17 in terms of potential. For built-in plug-in connectors without a circuit board 36, other types of arrangement for the light sources are also possible, for example the "overhanging" arrangement of wired light sources, preferably LEDs or OLEDs. The light source is preferably designed or can be actuated to emit light of at least two different colors, for which purpose for example multiple illumination means of different colors can be used. If need be, the control of the light source can be coupled to a switch for setting different states of the built-in plug-in connector arrangement and configured in such a way that different states are indicated by emitting light of different colors, for example for a visual identification or optical display of the connection status or the characterization of various diagnostics messages.

In the same way as was explained in connection with FIGS. 1 to 9, it is also possible for the embodiment of a built-in plug-in connector according to the invention that is provided with the light-emitting front plate 34 to be equipped with a locking device 16, 17 for the complementary plug-in connector, preferably cable plug, in order to prevent it from being inadvertently pulled out, and therefore release of the plug-in connection, here, too. In this case, the unlocking element 17 protrudes through the front plate 34 and the wall W of the unit, the switchboard or the like and is thus accessible to the user. With respect to the function and attachment of the locking arrangement, reference is made to the corresponding embodiments relating to FIGS. 1 to 9.

Preference is again given in any case to an embodiment of the unlocking element 17 in which the center point Z of the actuating tab 21 and a longitudinal center axis L of the connecting portion 18 are offset with respect to one another radially in relation to this longitudinal center axis L, as illustrated specifically in FIGS. 4 to 7 and 9. Therefore, for the embodiment of the built-in plug-in connector according to FIGS. 10 to 13, too, in the case of generally routine positioning of the locking device 16, 17 in the uppermost region of the housing 1, it is possible to reduce the overall structural height of the plug-in connector and thus obtain a space-saving structure.

A further embodiment of a built-in plug-in connector with a locking arrangement 16, 17 designed according to the invention and an asymmetrical actuating tab 21 of the unlocking element 17 is illustrated in FIGS. 18 to 21. What is involved here is an XLR chassis socket with a housing 1 and contact carriers 8, formed or inserted therein, with five contact elements 17. The housing 1, present here as an example in yet another embodiment than was shown before, for the purpose of fastening the built-in plug-in connector in units, switchboards, or the like, has at least two diametrically opposite fastening tabs 39 with mounting bores 40 therein.

In the same way as was explained in connection with FIGS. 1 to 9, the built-in plug-in connector of FIGS. 18 to 21 is also equipped with a locking device 16, 17, preferably received in the contact carrier 8 designed here for the XLR system, for the complementary plug-in connector. Here, again, its unlocking element 17 protrudes beyond the front end face of the housing 1 and contact carrier 8, in order consequently to be easily accessible to the user when they desire to release the locking of the plug-in connection. With respect to the function and attachment of the locking arrangement, reference is made to the corresponding embodiments relating to FIGS. 1 to 9. For a small vertical installation height in this embodiment, too, the unlocking element 17 is equipped with an actuating tab 21, in which the center point Z of the actuating tab 21 and a longitudinal center axis L of the connecting portion 18 are offset with respect to one another radially in relation to this longitudinal center axis L.

Figure 22:
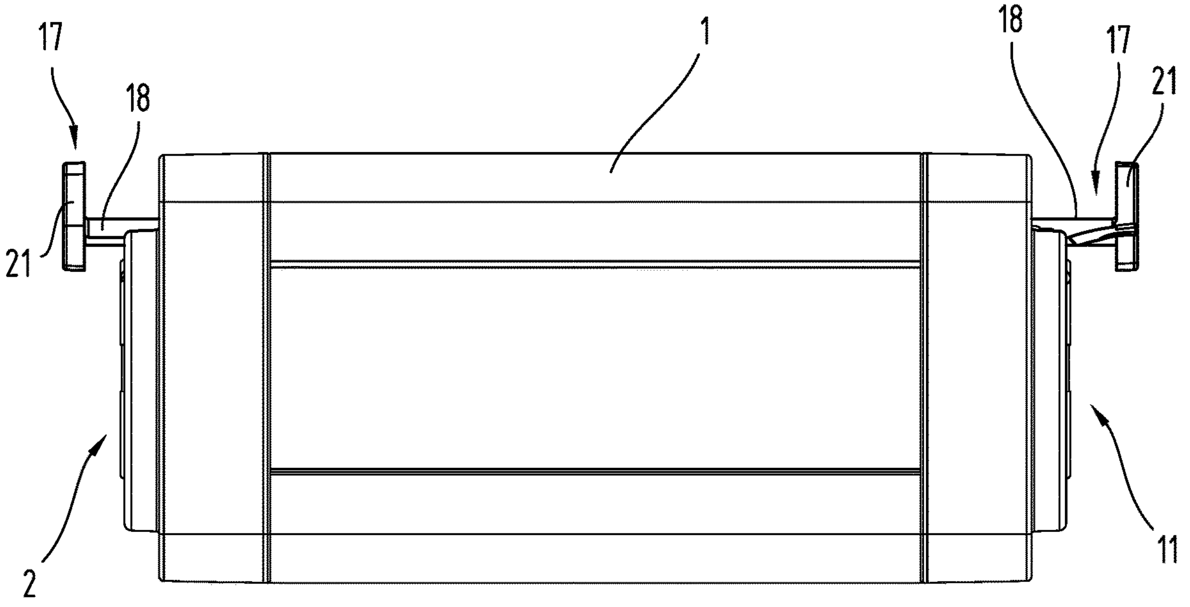
FIG. 22 shows a side view of a coupler in the form of a further exemplary embodiment for a plug-in connector according to the invention having the unlocking element according to the invention.
Figure 23:
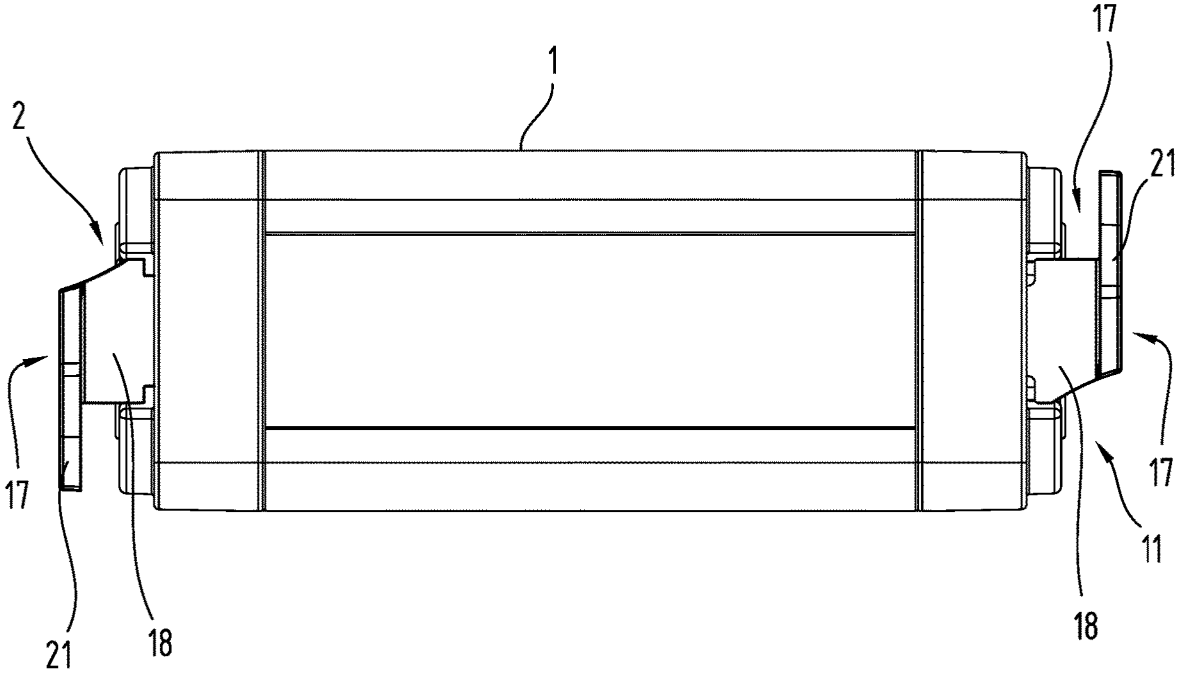
FIG. 23 shows a view from above of the coupler of FIG. 23.
Figure 24:
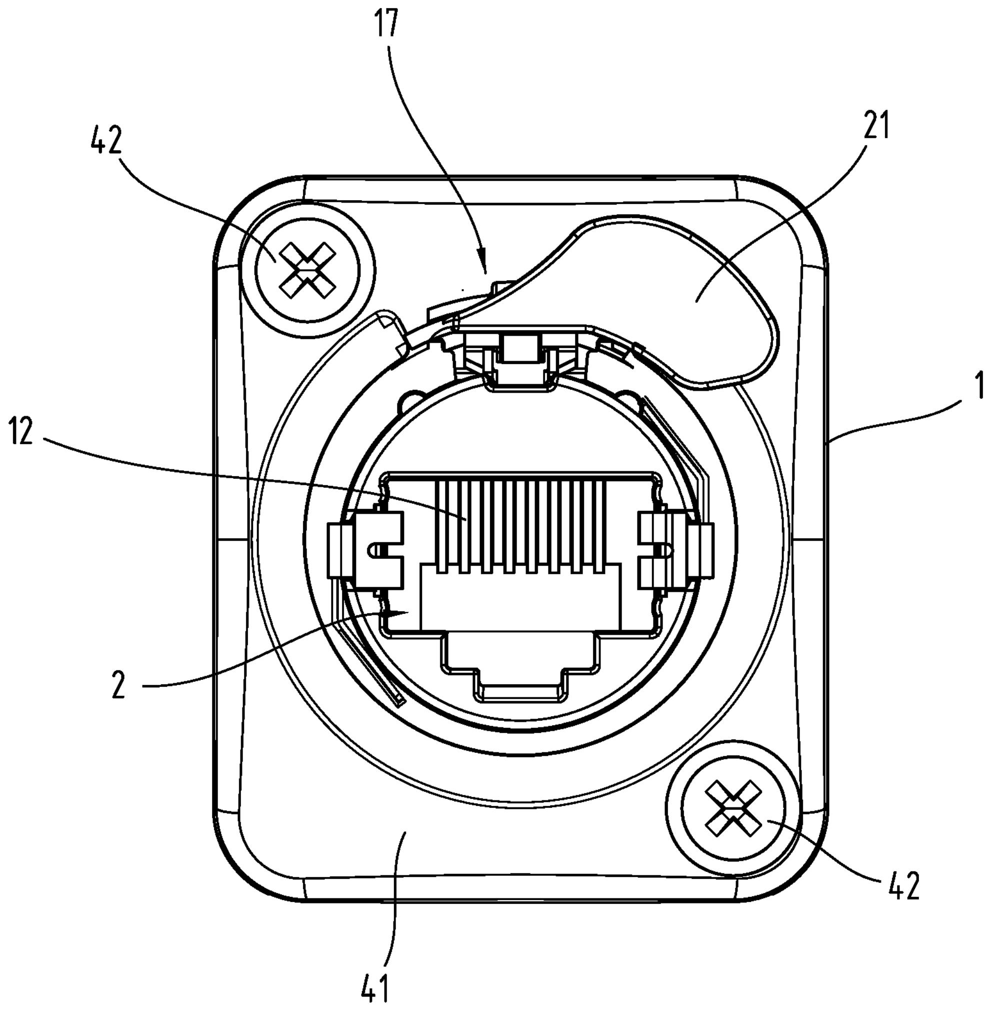
FIG. 24 shows a view of the coupler of FIG. 23 from one of the two plug-in directions.
Figure 25:
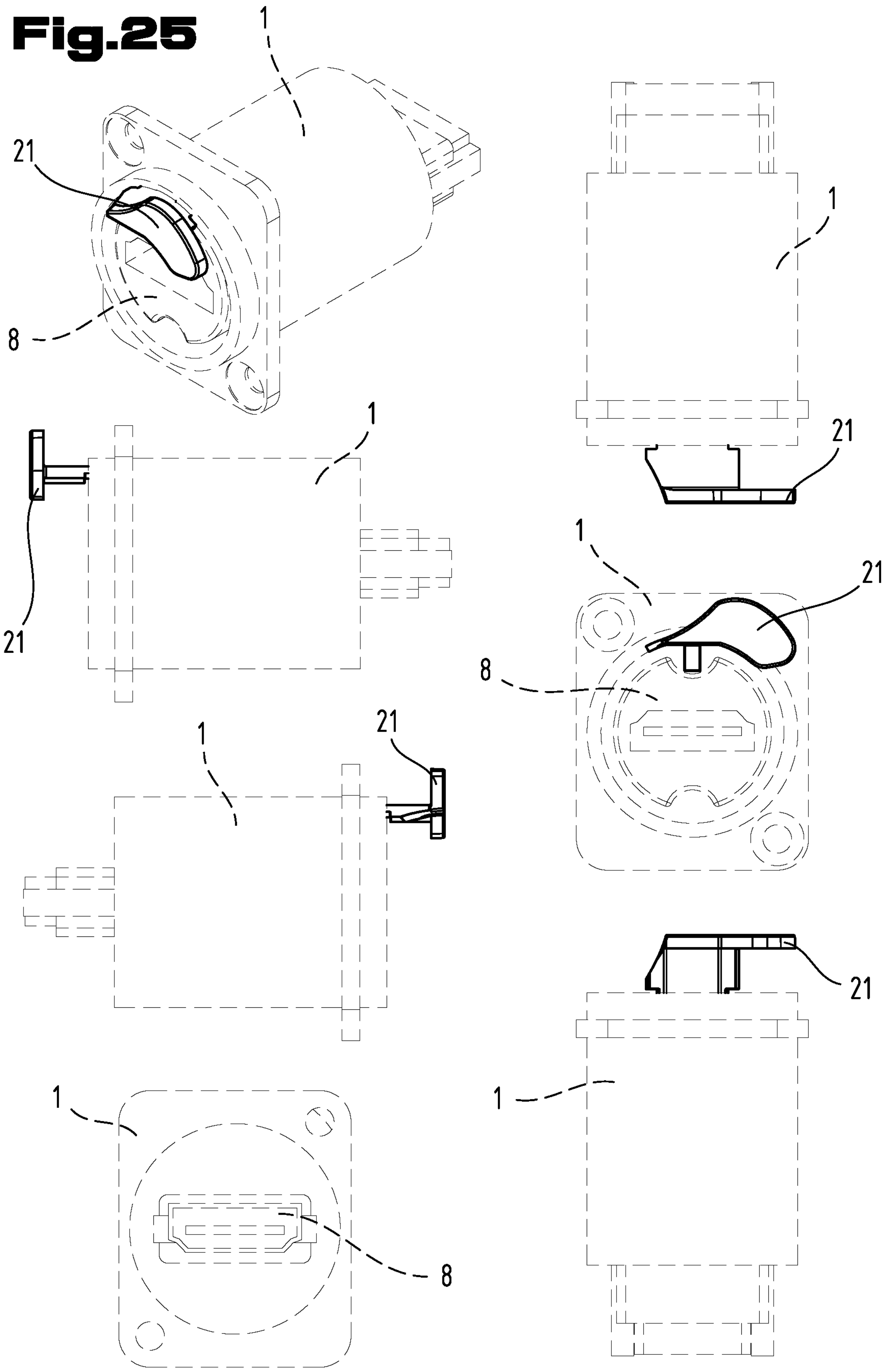
FIG. 25 shows multiple views from various directions of a further embodiment of a built-in plug-in connector according to the invention having the unlocking element according to the invention.
Figure 26:
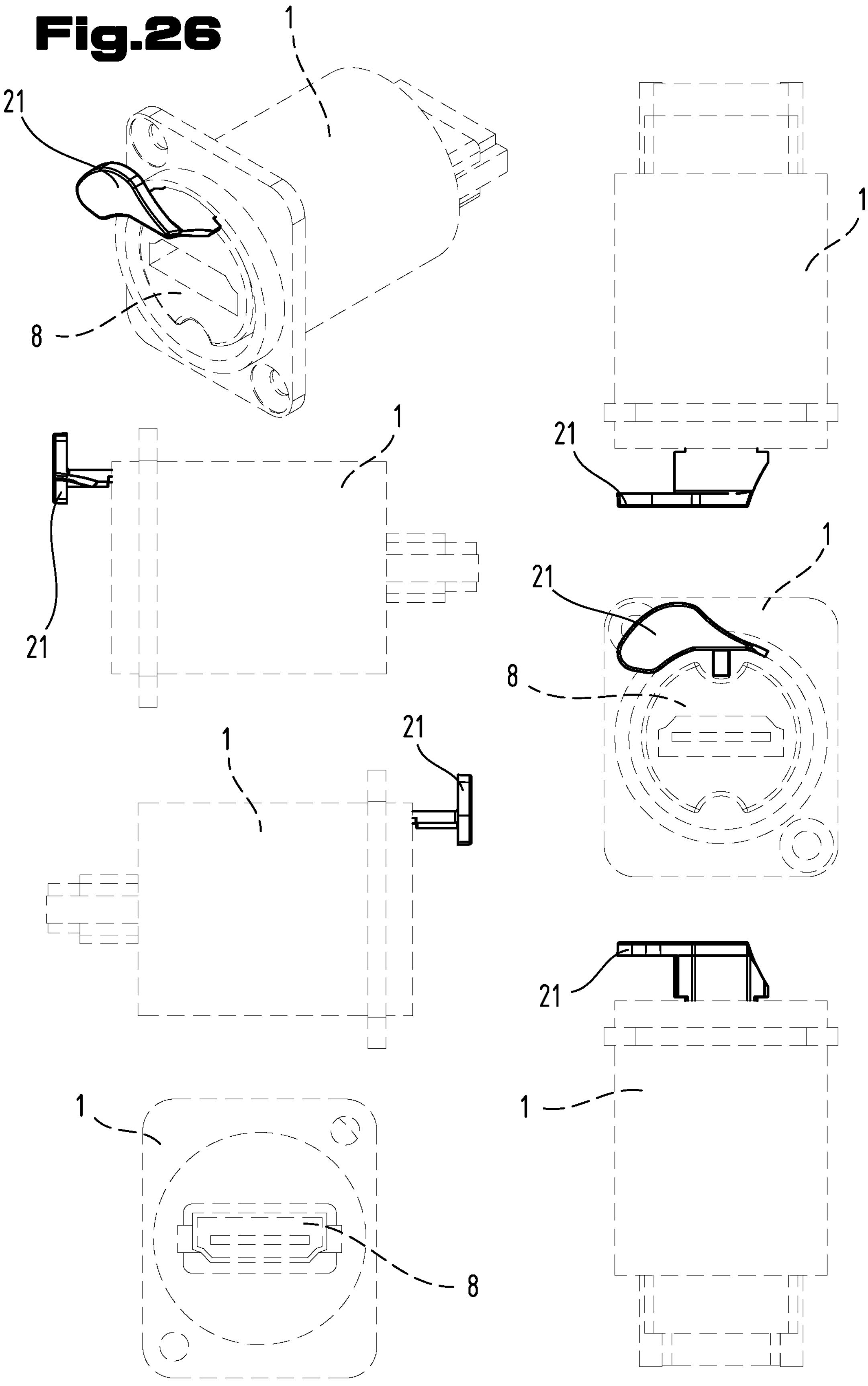
FIG. 26 shows multiple views from various directions of a further embodiment of a built-in plug-in connector according to the invention having the unlocking element according to the invention.
Figure 27:
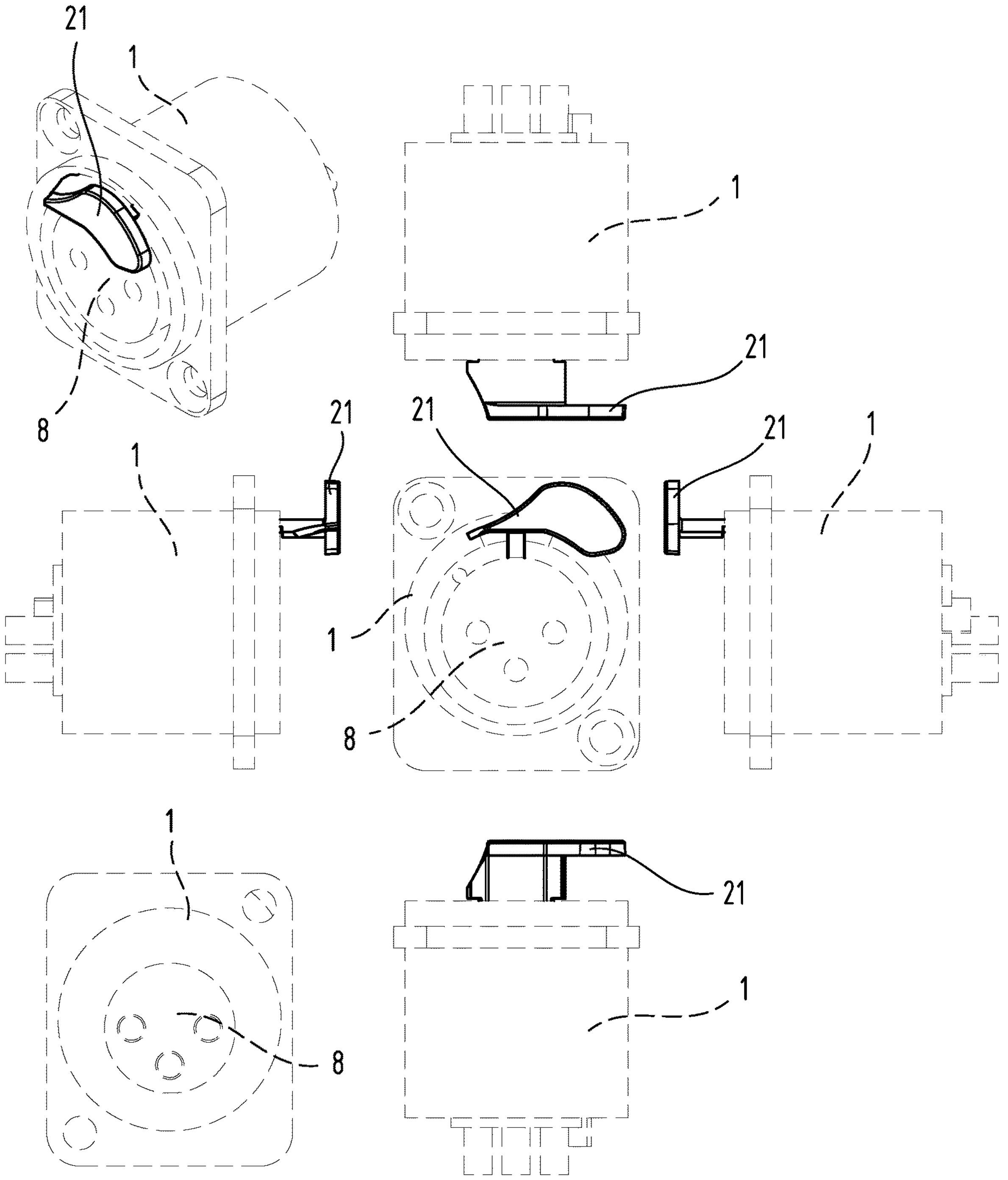
FIG. 27 shows multiple views from various directions of a further embodiment of a built-in plug-in connector according to the invention having the unlocking element according to the invention.
Figure 28:
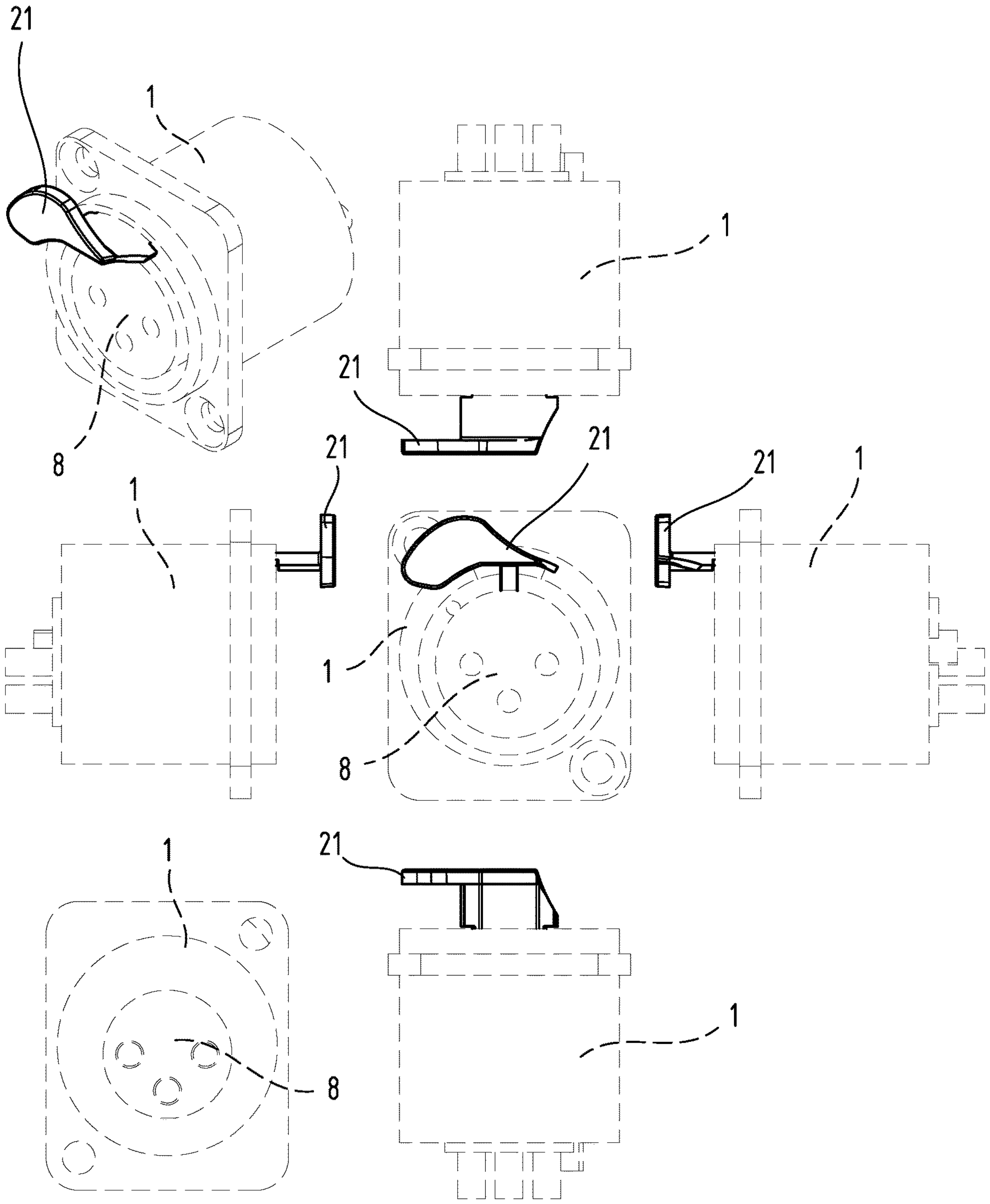
FIG. 28 shows multiple views from various directions of a further embodiment of a built-in plug-in connector according to the invention having the unlocking element according to the invention.
Figure 29:
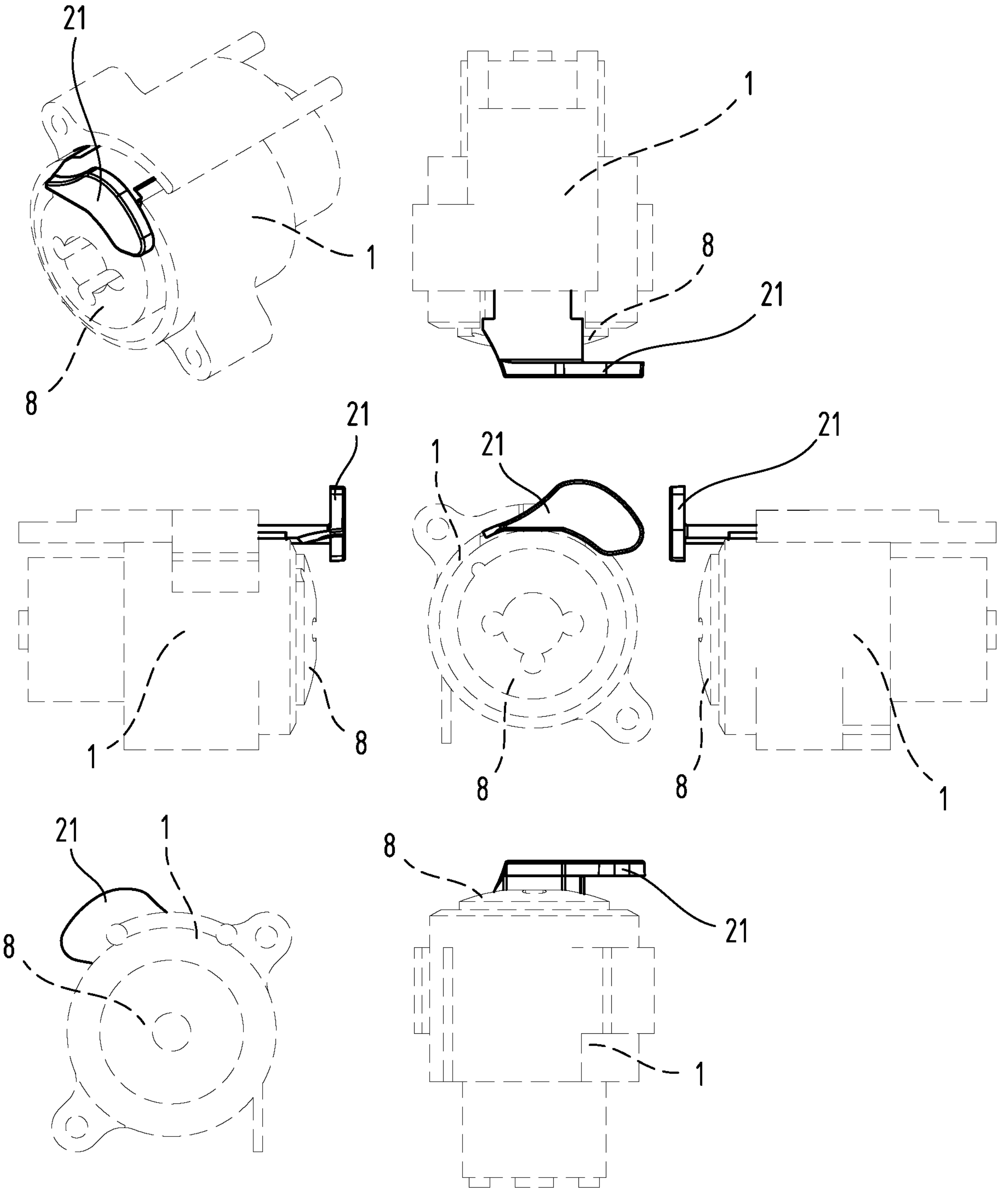
FIG. 29 shows multiple views from various directions of a further embodiment of a built-in plug-in connector according to the invention having the unlocking element according to the invention.
Figure 30:
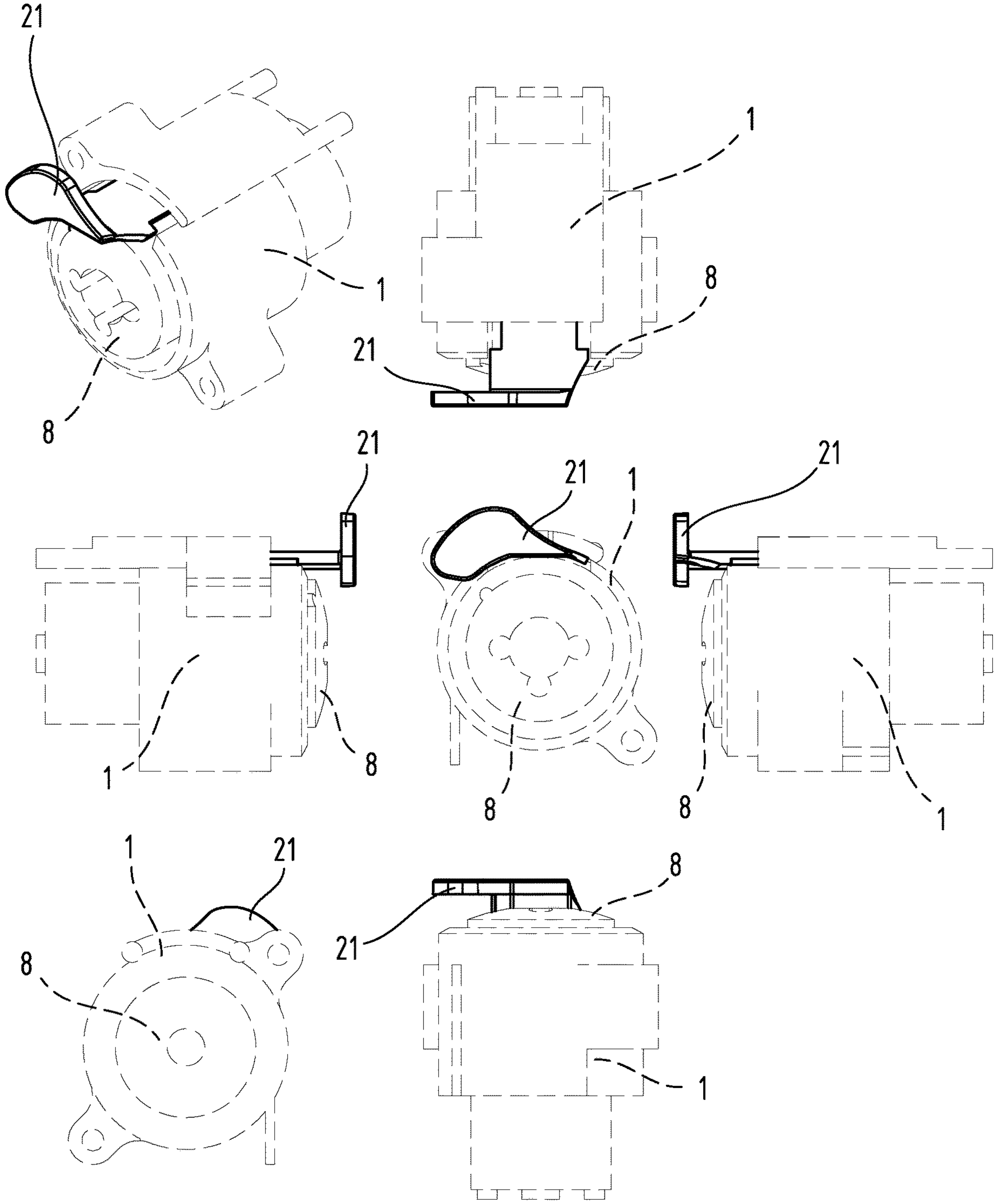
FIG. 30 shows multiple views from various directions of a further embodiment of a built-in plug-in connector according to the invention having the unlocking element according to the invention.

In order to show that the invention is not restricted to built-in plug-in connectors, as a further exemplary embodiment for a plug-in connector FIGS. 22 to 24 illustrate a coupling for two similar plug-in connectors, preferably for cable plugs. Its cuboidal, if need be also cylindrical, housing 1 has two plug-in openings 2, preferably for cable plugs, which openings are formed on opposite end faces of the housing 1. At least one of these plug sockets on the end faces of the housing 1, preferably both plug sockets, is provided with a locking arrangement as was explained in connection with FIGS. 1 to 9.

As can be seen in FIG. 24, the end plates 41, which the contact carriers 8, here for RJ45 contacts 17, are fixed by means of the mounting screws 42 and thus also fix the contact carriers 8 in the housing 1. Since this component no longer protrudes beyond the cross section of the housing 1 owing to the new positioning of the actuating tab 21 offset with respect to the longitudinal center plane, the risk of cables or the user becoming caught on it and possibly dragging along or damaging the coupling or causing other damage can be significantly reduced.

When the unlocking element 17, preferably also the locking arm 16, is designed with a short structure as explained in the introduction, it is also possible to correspondingly reduce the overall length of the coupling and as a whole obtain a significant reduction in the installation size in all dimensions.

The further FIGS. 25 to 30 show further embodiments for built-in plug-in connectors according to the invention, with different configurations of the housing 1, with various contact carriers 8 for different plug shapes, and with an unlocking element 17 which is designed according to the invention and has an asymmetrically shaped and aligned actuating tab 21.

| List of Reference Signs | |
|---|---|
| 1 | Housing |
| 2 | Plug-in opening |
| 3 | Connecting flange |
| 4 | Recess |
| 5 | Flange plate |
| 6 | Plug-in opening |
| 7 | Mounting bore |
| 8 | Contact carrier |
| 9 | Grounding contact |
| 10 | Rear cap |
| 11 | Plug-in opening |
| 12 | Contact element |
| 13 | Contact set |
| 14 | Insulating body |
| 15 | Housing cover |
| 16 | Locking arm |
| 17 | Unlocking element |
| 18 | Connecting portion |
| 19 | Actuating portion |
| 20 | Recess |
| 21 | Actuating tab |
| 22 | Recess |
| 23 | Locking projection |
| 24 | Actuating portion |
| 25 | Oblique surface |
| 26 | Straight leg |
| 27 | Curved portion |
| 28 | Curved leg |
| 29 | Tab |
| 30 | Stop |
| 31 | Stop element |
| 32 | Cutout |
| 33 | Cutout |
| 34 | Front plate |
| 35 | Web |
| 36 | Printed circuit board |
| 37 | Mounting portion |
| 38 | Mounting bore |
| 39 | Fastening tab |
| 40 | Mounting bore |
| 41 | End plate |
| 42 | Mounting screw |
| L | Longitudinal center axis |
| M | Center axis |
| P | Bending axis |
| Z | Center point |

The invention claimed is:

1. An electrical plug-in connector for producing an electrical plug-in connection with a complementary plug-in connector, the electrical plug connector comprising:

a housing including a first plug-in opening, into which the complementary plug-in connector is pluggable in a direction of a plug-in axis;

at least one contact carrier having at least one electrical contact element held in the contact carrier;

a locking arrangement for the complementary plug-in connector, the locking arrangement comprising at least one elastically deflectable or displaceable locking arm, each having at least one first locking structure which, in a fully plugged-in state of the complementary plug-in connector, couples into a second, complementary locking structure of the complementary plug-in connector;

at least one unlocking element that is manually displaceable from a passive position into an active position;

at least one actuating portion on the unlocking element which, in the active position, engages on the locking arm and keeps a locking structure of the locking arm out of engagement with the complementary locking structure; and at least one unlocking surface on the locking arm, on which the actuating portion engages in the active position, the unlocking element is formed with an actuating tab that is configured to be touched by a user and is coated with or produced from electrically insulating plastic, wherein the plug-in connector is configured as a built-in plug socket, and a center point of the actuating tab is offset to a side with respect to a central plane, which is vertical in a built-in position, by an angle between 30° and 60°.

2. The electrical plug-in connector according to claim 1, wherein a longitudinal center axis of a connecting portion that extends from the actuating tab in a direction of the actuating portion is substantially in line with the center point of the actuating tab and is offset with respect to a central plane, which is vertical in the built-in position, by an angle between 30° and 60°.

3. The electrical plug-in connector according to claim 1, wherein a longitudinal center axis of a connecting portion that extends from the actuating tab in a direction of the actuating portion is arranged substantially in a region of the vertical central plane.

4. The electrical plug-in connector according to claim 1, wherein the unlocking surface of the locking arm is at least partially coated with or produced from electrically insulating plastic or the entire locking arm is coated with or produced from electrically insulating plastic.

5. The electrical plug-in connector according to claim 1, wherein the locking arrangement for the complementary plug-in connector is received in a recess in at least one of the housing or the at least one contact carrier.

6. The electrical plug-in connector according to claim 1, wherein the unlocking element is mounted in a recess of the contact carrier so as to be displaceable parallel to the plug-in axis.

7. The electrical plug-in connector according to claim 1, further comprising a second plug-in opening for a further plug-in connector arranged on an opposite side to the first plug-in opening.

8. The electrical plug-in connector according to claim 7, wherein further plug-in connector includes a further one of the locking arrangements.

9. An electrical plug-in connector for producing an electrical plug-in connection with a complementary plug-in connector, the electrical plug connector comprising:

a housing including a first plug-in opening, into which the complementary plug-in connector is pluggable in a direction of a plug-in axis;

at least one contact carrier having at least one electrical contact element held in the contact carrier;

a locking arrangement for the complementary plug-in connector, the locking arrangement comprising at least one elastically deflectable or displaceable locking arm, each having at least one first locking structure which, in a fully plugged-in state of the complementary plug-in connector, couples into a second, complementary locking structure of the complementary plug-in connector;

at least one unlocking element that is manually displaceable from a passive position into an active position;

at least one actuating portion on the unlocking element which, in the active position, engages on the locking arm and keeps a locking structure of the locking arm out of engagement with the complementary locking structure; and at least one unlocking surface on the locking arm, on which the actuating portion engages in the active position, the unlocking element is formed with an actuating tab that is configured to be touched by a user and is coated with or produced from electrically insulating plastic, wherein a longitudinal center axis of a connecting portion that extends from the actuating tab in a direction of the actuating portion is substantially in line with a center point of the actuating tab and is offset with respect to a central plane, which is vertical in a built-in position, by an angle between 30° and 60°.

10. An electrical plug-in connector for producing an electrical plug-in connection with a complementary plug-in connector, the electrical plug connector comprising:

a housing including a first plug-in opening, into which the complementary plug-in connector is pluggable in a direction of a plug-in axis;

at least one contact carrier having at least one electrical contact element held in the contact carrier;

a locking arrangement for the complementary plug-in connector, the locking arrangement comprising at least one elastically deflectable or displaceable locking arm, each having at least one first locking structure which, in a fully plugged-in state of the complementary plug-in connector, couples into a second, complementary locking structure of the complementary plug-in connector;

at least one unlocking element that is manually displaceable from a passive position into an active position;

at least one actuating portion on the unlocking element which, in the active position, engages on the locking arm and keeps a locking structure of the locking arm out of engagement with the complementary locking structure; and at least one unlocking surface on the locking arm, on which the actuating portion engages in the active position, the unlocking element is formed with an actuating tab that is configured to be touched by a user and is coated with or produced from electrically insulating plastic, wherein a longitudinal center axis of a connecting portion that extends from the actuating tab in a direction of the actuating portion is arranged substantially in a region of a vertical central plane.

* * * * *